US008934333B2

(12) United States Patent
Kim et al.

(10) Patent No.: US 8,934,333 B2
(45) Date of Patent: Jan. 13, 2015

(54) METHOD AND DEVICE FOR TRANSMITTING/RECEIVING DATA IN WIRELESS COMMUNICATION SYSTEM SUPPORTING RELAY NODE

(75) Inventors: Dongin Kim, Seongnam-si (KR); Wan Choi, Daejeon-si (KR); Jingyu Kim, Ulsan (KR); Byounghoon Kim, Anyang-si (KR); Hanbyul Seo, Anyang-si (KR)

(73) Assignees: LG Electronics Inc., Seoul (KR); Research & Business Foundation Sungkyunkwan University, Suwon-Si, Gyeonggi-Do (KR); Korea Advanced Institute of Science and Technology, Daejeon (KR)

( * ) Notice: Subject to any disclaimer, the term of this patent is extended or adjusted under 35 U.S.C. 154(b) by 90 days.

(21) Appl. No.: 13/816,168

(22) PCT Filed: Jun. 30, 2011

(86) PCT No.: PCT/KR2011/004800
§ 371 (c)(1),
(2), (4) Date: Feb. 8, 2013

(87) PCT Pub. No.: WO2012/020918
PCT Pub. Date: Feb. 16, 2012

(65) Prior Publication Data
US 2013/0135988 A1 May 30, 2013

Related U.S. Application Data

(60) Provisional application No. 61/372,446, filed on Aug. 10, 2010.

(51) Int. Cl.
G06F 11/00 (2006.01)
H04W 8/30 (2009.01)
(Continued)

(52) U.S. Cl.
CPC ............... *H04W 8/30* (2013.01); *H04L 1/1819* (2013.01); *H04L 1/1887* (2013.01); *H04L 2001/0097* (2013.01); *H04W 84/047* (2013.01); *H04B 7/15592* (2013.01)
USPC ........................... 370/216; 370/235; 370/400

(58) Field of Classification Search
USPC .............. 370/216, 230.1, 231, 235, 389, 390, 370/392, 400–401, 465, 31
See application file for complete search history.

(56) References Cited

U.S. PATENT DOCUMENTS 8,638,741 B2 * 1/2014 Hariharan et al. ............ 370/329
8,700,023 B2 * 4/2014 Nan et al. ...................... 370/230
(Continued)

OTHER PUBLICATIONS

PCT International Application No. PCT/KR2011/004800, Written Opinion of the International Searching Authority dated Dec. 28, 2011, 16 pages.

(Continued)

*Primary Examiner* — Kevin Mew
(74) *Attorney, Agent, or Firm* — Lee, Hong, Degerman, Kang & Waimey

(57) ABSTRACT

The present description relates to a method for transmitting data from a base station according to one embodiment of the present invention comprises: a step for transmitting to the relay node a signal having a first data to be delivered to a user equipment via the relay node; a step for transmitting to the user equipment a signal having a second data; and a step for receiving from the user equipment a HARQ confirmation response information regarding the first data delivered to the user equipment through the relay node, wherein the first data is retransmitted to the user equipment from the relay node when the HARQ confirmation response information is NACK, and scheduling information for transmitting the first data from the relay node to the user equipment and scheduling information for retransmitting the first data can be designated in advance by the base station.

12 Claims, 12 Drawing Sheets

(51) Int. Cl.
*H04L 1/18* (2006.01)
*H04L 1/00* (2006.01)
*H04W 84/04* (2009.01)
*H04B 7/155* (2006.01)

(56) References Cited

U.S. PATENT DOCUMENTS

| | | | |
|---|---|---|---|
| 2008/0049718 A1* | 2/2008 | Chindapol et al. | 370/351 |
| 2009/0116419 A1 | 5/2009 | Chong et al. | |
| 2009/0150739 A1* | 6/2009 | Park et al. | 714/749 |
| 2010/0150177 A1* | 6/2010 | Cai et al. | 370/476 |
| 2010/0272009 A1* | 10/2010 | Cheng et al. | 370/315 |
| 2013/0016604 A1* | 1/2013 | Ko et al. | 370/216 |
| 2013/0070583 A1* | 3/2013 | Xu et al. | 370/216 |

OTHER PUBLICATIONS

Alcatel-Lucent, et al., "Type 1 Relay Un Configuration and HARQ operation," R1-104097, 3GPP TSG RAN WG1 #61bis, Jun. 2010, 4 pages.
Panasonic, "UL/DL HARQ timing for backhaul," R1-104132, 3GPP TSG-RAN WG1 Meeting #61bis, Jun. 2010, 7 pages.
PCT International Application No. PCT/KR2011/004800, Written Opinion of the International Searching Authority dated Dec. 28, 2011, 9 pages.

* cited by examiner (a)

(b)

(a) data encoded for $U_1$ (a) data encoded for $U_2$

METHOD AND DEVICE FOR TRANSMITTING/RECEIVING DATA IN WIRELESS COMMUNICATION SYSTEM SUPPORTING RELAY NODE

CROSS-REFERENCE TO RELATED APPLICATIONS

This application is the National Stage filing under 35 U.S.C. 371 of International Application No. PCT/KR2011/004800, filed on Jun. 30, 2011, which claims the benefit of U.S. Provisional Application Ser. No. 61/372,446, filed on Aug. 10, 2010, the contents of which are all hereby incorporated by reference herein in their entirety.

TECHNICAL FIELD

The following description relates to wireless communication, and more specifically, to a method and device for transmitting/receiving data in a wireless communication system supporting a relay node.

BACKGROUND ART

FIG. 1 illustrates a relay node (RN) 120 and user equipments (UEs) 131 and 132, which are present in the service area of an eNodeB (eNB) 110 in a wireless communication system 100. The relay node 120 can transmit data received from the eNB 110 to the UE 132 located in the area of the relay node and transmit data received from the UE 132 to the eNB 110. In addition, the relay node 120 can support extension of a high data rate area, improvement of communication quality at a cell edge and provision of communication to the inside of a building or an area out of the service area of the eNB. FIG. 1 shows a UE (referred to as a macro-UE or M-UE hereinafter) that directly receives a service from the eNB, such as the UE 131, and a UE (referred to as a relay UE or R-UE hereinafter) that receives a service via the relay node 120, such as the UE 132.

A wireless link between the eNB 110 and the relay node 120 is referred to as a backhaul link. A link from the eNB 110 to the relay node 120 is referred to as a backhaul downlink and a link from the relay node 120 to the eNB 110 is referred to as a backhaul uplink. A wireless link between the relay node 120 and the UE 132 is referred to as an access link. A link from the relay node 120 to the UE 132 is called an access downlink and a link from the UE 132 to the relay node 120 is called an access downlink.

When the relay node 120 controls the corresponding cell, the UE 132 can recognize the relay node 120 as a normal eNB. When another UE functions as the relay node 120 (a relay node of this type is called a UE-relay), the UE 132 cannot recognize the presence of the relay node 120.

DISCLOSURE

Technical Problem

An object of the present invention is to provide a method for using radio resources more efficiently and successfully transmitting data when data is transmitted from a base station (BS) to a UE through a user-relay. Specifically, an object of the present invention is to provide a method for configuring data to be delivered to a UE through a user-relay and data to be directly delivered to the UE from a BS when the BS transmits data to the UE. Another object of the present invention is to provide a method for determining resources and a transmission rate, which are used for a user-relay to deliver data to a UE and a method for performing retransmission when the UE fails to decode data.

The technical problems solved by the present invention are not limited to the above technical problems and those skilled in the art may understand other technical problems from the following description.

Technical Solution

According to one aspect of the present invention, a method for transmitting data from a base station includes: transmitting, to a relay node, a signal including first data to be delivered to a user equipment via the relay node; transmitting a signal including second data to the user equipment; and receiving, from the user equipment, HARQ ACK/NACK information regarding the first data delivered to the user equipment through the relay node, wherein the first data is retransmitted to the user equipment from the relay node when the HARQ ACK/NACK information is NACK, and scheduling information for transmission of the first data from the relay node to the user equipment and scheduling information for retransmission of the first data are designated in advance by the base station.

According to another aspect of the present invention, a method for transmitting data from a relay node includes: receiving, from a base station, a signal including first data to be delivered to a user equipment via the relay node, transmitting the first data to the user equipment; receiving HARQ ACK/NACK information regarding the first data from the user equipment; and retransmitting the first data to the user equipment when the HARQ ACK/NACK information is NACK, wherein scheduling information for transmission of the first data from the relay node to the user equipment and scheduling information for retransmission of the first data are designated in advance by the base station.

According to another aspect of the present invention, a base station transmitting data includes: a transmission module for transmitting signals to one or both of a relay node and a user equipment; a reception module for receiving signals from one or both of the relay node and the user equipment; and a processor for controlling operations of the base station, the processor being connected to the reception module and the transmission module. The processor is configured to transmit, to the relay node through the transmission module, a signal including first data to be delivered to the user equipment via the relay node, to transmit a signal including second data to the user equipment through the transmission module, and to receive, from the user equipment through the reception module, HARQ ACK/NACK information regarding the first data delivered to the user equipment through the relay node. The first data is retransmitted to the user equipment from the relay node when the HARQ ACK/NACK information is NACK, and scheduling information for transmission of the first data from the relay node to the user equipment and scheduling information for retransmission of the first data are designated in advance by the base station.

According to another aspect of the present invention, a relay node transmitting data includes: a first reception module for receiving a signal from a base station; a first transmission module for transmitting a signal to the base station; a second reception module for receiving a signal from a user equipment; a second transmission module for transmitting a signal to the user equipment; and a processor for controlling operations of the relay node, the processor being connected to the first and second reception modules and the first and second transmission modules. The processor is configured to receive, from the base station through the first reception module, a signal including first data to be delivered to the user equipment via the relay node, to transmit the first data to the user equipment through the second transmission module, to receive HARQ ACK/NACK information regarding the first data from the user equipment through the second reception module, and to retransmit the first data to the user equipment through the second transmission module when the HARQ ACK/NACK information is NACK. Scheduling information for transmission of the first data from the relay node to the user equipment and scheduling information for retransmission of the first data are designated in advance by the base station.

The following is applicable to the above-described embodiments of the present invention.

The scheduling information may be determined on the basis of probability that outage occurs on a channel between the relay node and the user equipment.

The scheduling information may include one or more of a time resource, a frequency resource and a transmission rate used for transmission or retransmission of the first data.

The relay node may overhear the HARQ ACK/NACK information regarding transmission or retransmission of the first data, transmitted from the user equipment.

Retransmission of the relay node may be performed according to an incremented redundancy (IR) scheme.

The user equipment may restore data therefor using the first data and the second data.

The first data and the second data may respectively correspond to parts obtained by partitioning information channel-coded by a channel coder in the base station, the information being destined for the user equipment.

The technical problems solved by the present invention are not limited to the above technical problems and those skilled in the art may understand other technical problems from the following description.

Advantageous Effects

According to embodiments of the present invention, it is possible to provide a method for using radio resources more efficiently and successfully transmitting data when data is transmitted from a base station (BS) to a UE through a user-relay. Furthermore, it is possible to provide a method for configuring data to be delivered to a UE through a user-relay and data to be directly delivered to the UE from a BS when the BS transmits data to the UE. In addition, it is possible to provide a method for determining resources and a transmission rate, which are used for a user-relay to deliver data to a UE and a method for performing retransmission when the UE fails to decode data.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Figure 1:
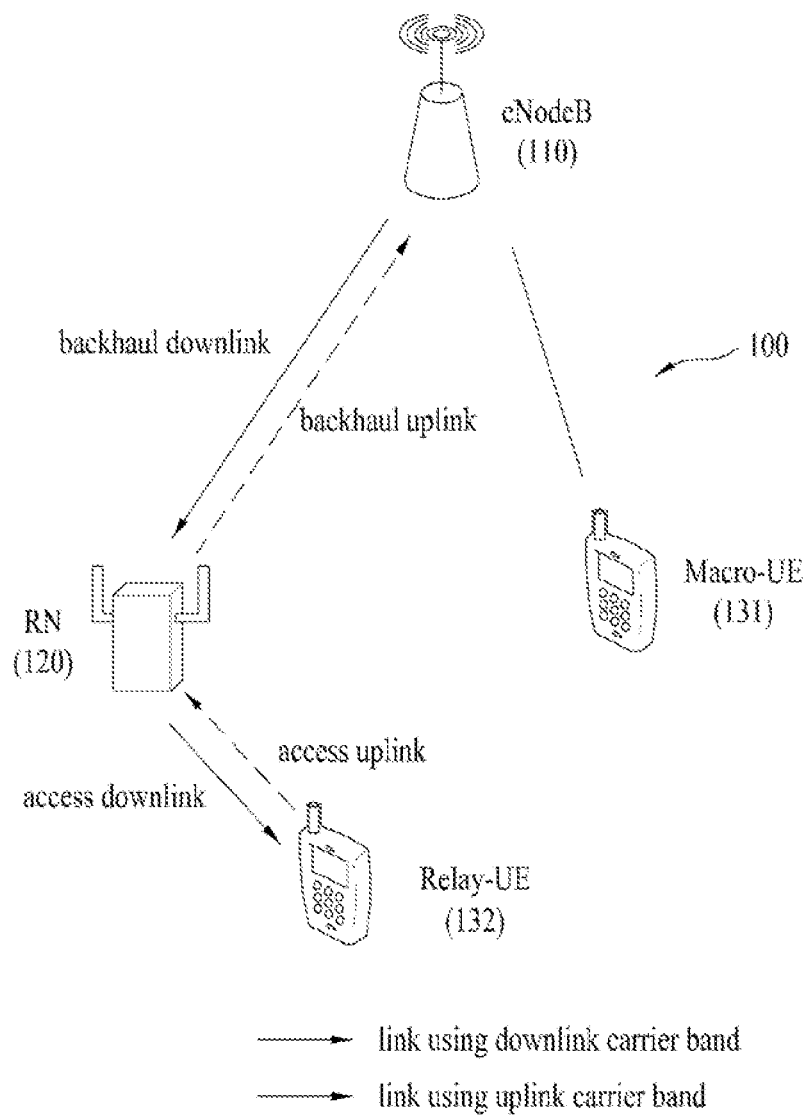
FIG. 1 shows a wireless communication system including an eNB, a relay node and UEs.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is given centering on a data transmission and reception relationship between a base station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to aid in understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA). Orthogonal Frequency Division Multiple Access (OFDMA). Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

Figure 2:
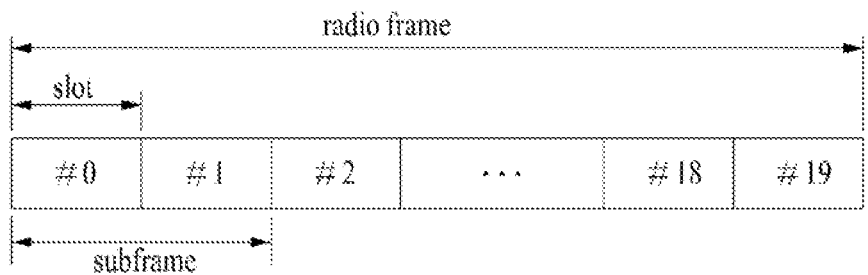
FIG. 2 shows the structure of a radio frame used in a 3GPP LTE system.

FIG. 2 illustrates an exemplary radio frame structure used in a 3GPP LTE system. A radio frame is divided into 10 subframes. Each subframe is further divided into two slots in the time domain. A unit time during which one subframe is transmitted is defined as Transmission Time Interval (TTI). For example, one subframe may be 1 ms in duration and one slot may be 0.5 ms in duration. A slot may include a plurality of Orthogonal Frequency Division Multiplexing (OFDM) symbols in the time domain. Because the 3GPP LTE system adopts OFDMA for downlink, an OFDM symbol represents one symbol period. A symbol may be referred to as an SC-FDMA symbol or symbol period on the uplink. A Resource Block (RB) is a resource allocation unit including a plurality of contiguous subcarriers in a slot. This radio frame structure is purely exemplary and thus the number of subframes in a radio frame, the number of slots in a subframe, or the number of OFDM symbols in a slot may vary.

Figure 3:
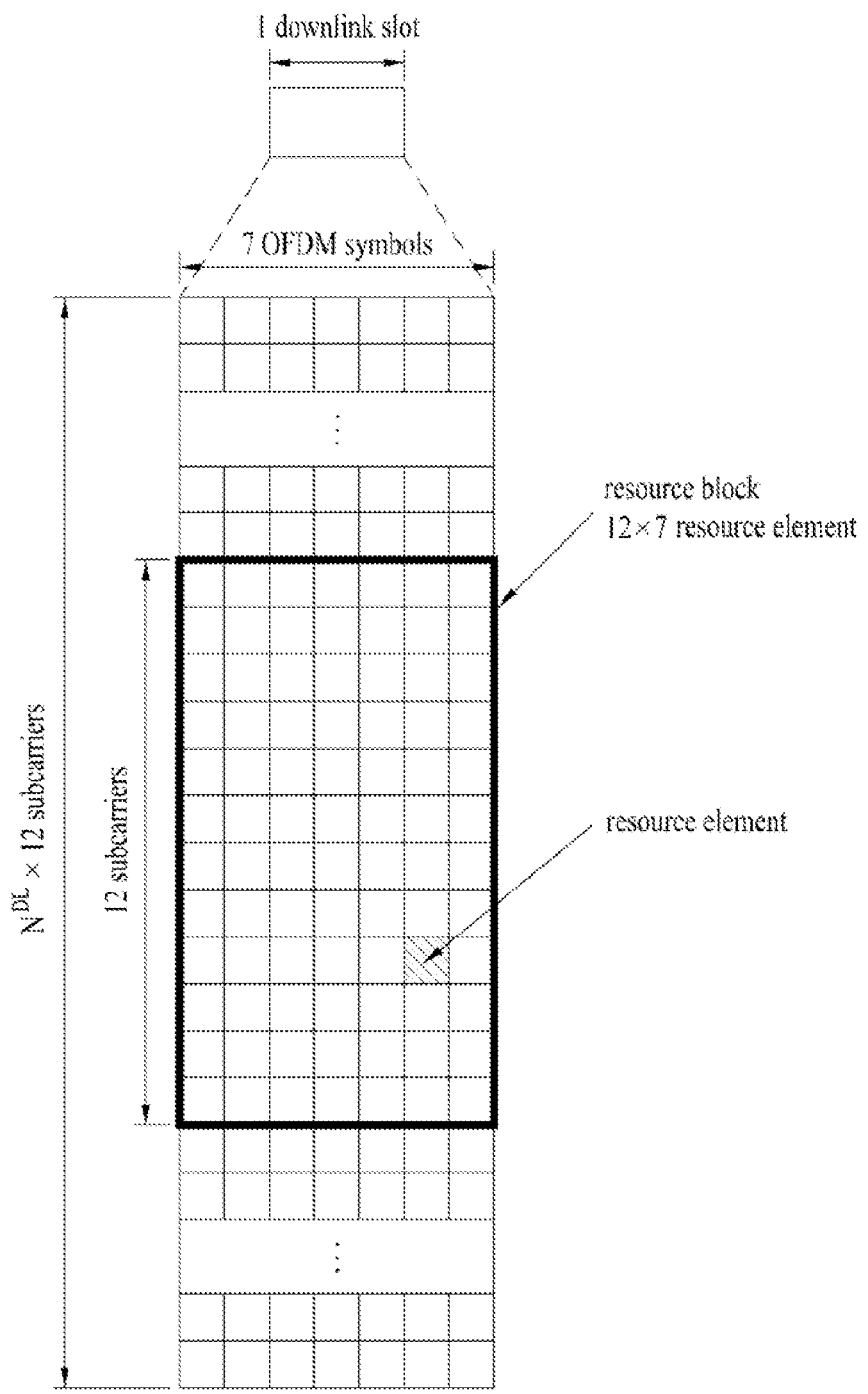
FIG. 3 shows a resource grid in a downlink slot.

FIG. 3 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot includes 7 OFDM symbols in case of a normal Cyclic Prefix (CP), whereas a downlink slot includes 6 OFDM symbols in case of an extended CP. Each element of the resource grid is referred to as a Resource Element (RE). An RB includes 12×7 REs. The number of RBs in a downlink slot, $N^{DL}$ depends on a downlink transmission bandwidth. An uplink slot may have the same structure as a downlink slot.

Figure 4:
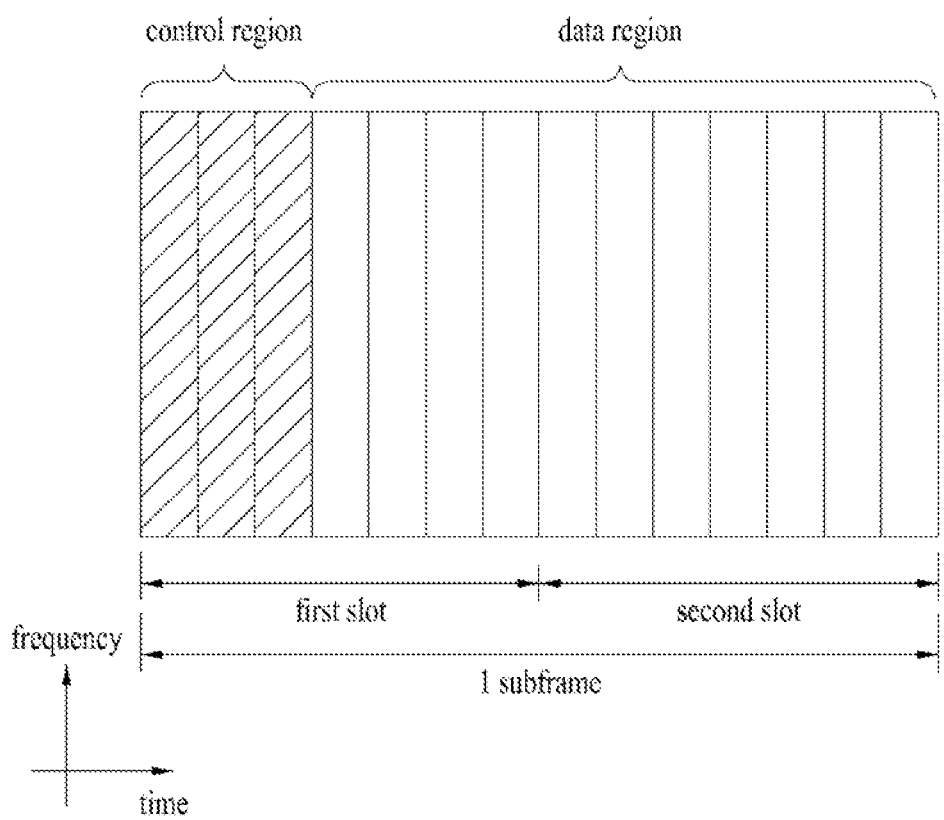
FIG. 4 shows a downlink subframe structure.

FIG. 4 illustrates a downlink subframe structure. Up to three OFDM symbols at the start of the first slot in a downlink subframe are used for a control region to which control channels are allocated and the other OFDM symbols of the downlink subframe are used for a data region to which a Physical Downlink Shared Channel (PDSCH) is allocated. Downlink control channels used in the 3GPP LTE system include a Physical Control Format Indicator Channel (PCFICH), a Physical Downlink Control Channel (PDCCH), and a Physical Hybrid automatic repeat request (ARQ) Indicator Channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE includes a set of REs. The format of a PDCCH and the number of available bits for the PDCCH are determined according to the correlation between the number of CCEs and a coding rate provided by the CCEs. The number of CCEs used for PDCCH transmission is called a CCE aggregation level. The CCE aggregation level is a CCE unit used to detect a PDCCH. The CCE aggregation level is defined by the number of neighboring CCEs. For example, the CCE aggregation level can be 1, 2, 4 or 8.

An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 5:
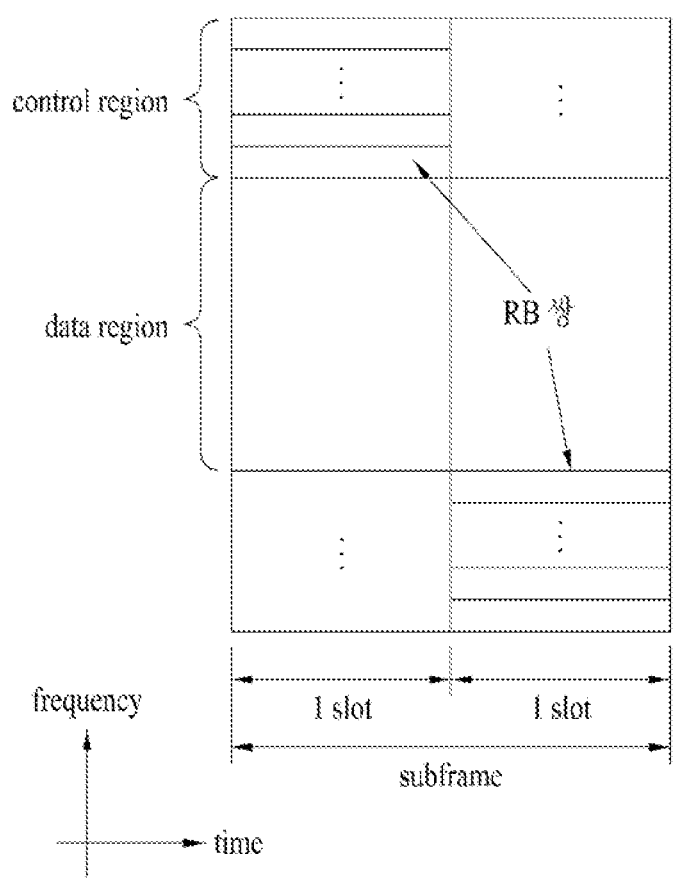
FIG. 5 shows an uplink subframe structure.

FIG. 5 illustrates an uplink subframe structure. An uplink subframe may be divided into a control region and a data region in the frequency domain. A Physical Uplink Control Channel (PUCCH) carrying uplink control information is allocated to the control region and a Physical Uplink Shared Channel (PUSCH) carrying user data is allocated to the data region. To maintain single-carrier characteristics, a UE does not transmit a PUSCH and a PUCCH simultaneously. A PUCCH for a UE is allocated to an RB pair in a subframe. The RBs of the RB pair occupy different subcarriers in two slots.

Thus it is said that the RB pair allocated to the PUCCH is frequency-hopped over a slot boundary.

Modeling of MIMO System

Figure 6:
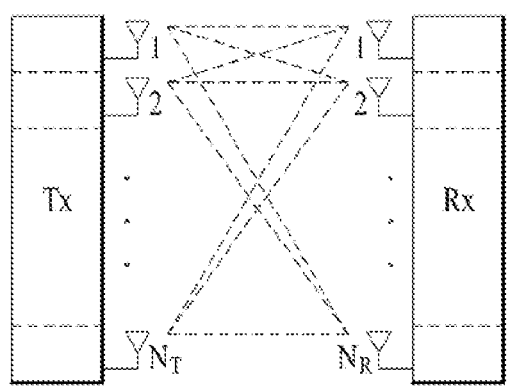
FIG. 6 shows a configuration of a wireless communication system having multiple antennas.
Figure 6:
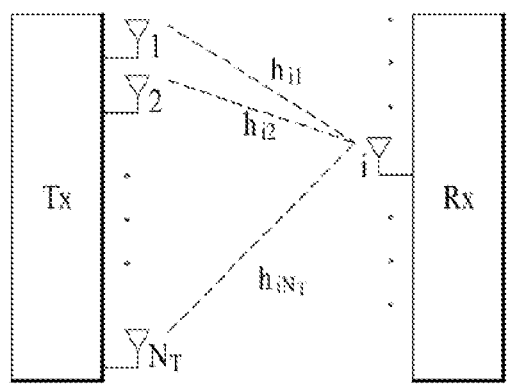

FIG. 6 illustrates the configuration of a wireless communication system having multiple antennas.

Referring to FIG. 6(*a*), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$, and a transmission rate increase rate $R_i$ illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system. Since theoretical capacity increase of the multi-antenna system was proved in the mid-90s, various technologies to lead the theoretical capacity increase to data transmission rate improvement have been actively studied. Furthermore, some technologies have been reflected in various wireless communication standards of $3^{rd}$ generation mobile communication, next-generation wireless LAN, etc.

Researches on the MIMO scheme, which have been actively performed up to now, include researches on information theories relating to calculation of multi-antenna communication capacity in various channel environments and multiple access environments, researches on radio channel measurement and model derivation of a MIMO system, researches on time-space signal processing technologies for improving transmission reliability and transmission rate, etc.

Communication in a MIMO system will be described in detail through mathematical modeling. It is assumed that $N_T$ Tx antennas and $N_R$ Rx antennas exist.

Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Herein, $w_{ij}$ denotes a weight between an $i^{th}$ Tx antenna and a $j^{th}$ piece of information. W is called a weight matrix or a precoding matrix.

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, the channels may be distinguished according to the indexes of Tx and Rx antennas. The channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 6(*b*) illustrates channels from $N_T$ Tx antennas to an $i^{th}$ Rx antenna. The channels may be represented as vectors and matrices by grouping them. As illustrated in FIG. 6(*b*), channels from the $N_T$ Tx antennas to an $i^{th}$ Rx antenna may be expressed as $$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$, added to the $N_R$ Rx antennas is given as the following vector.

$$n = [n_1, n_2, \ldots, n_{N_R}]^T \quad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \vdots \\ h_{i2} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} +$$ [Equation 10]

$$\begin{bmatrix} n_1 \\ n_2 \\ \vdots \\ n_i \\ \vdots \\ n_{N_R} \end{bmatrix} = Hx + n$$

In the meantime, the numbers of rows and columns in the channel matrix H representing channel states are determined according to the numbers of Tx and Rx antennas. The number of rows of the channel matrix H is identical to the number of Rx antennas, $N_R$ and the number of columns is identical to the number of Tx antennas, $N_T$. Thus, the channel matrix H is of size $N_R \times N_T$.

The rank of a matrix is defined as the smaller between the numbers of independent rows and columns. Accordingly, the rank of the matrix is not larger than the number of rows or columns. For example, the rank of the matrix H, rank(H) is limited as follows.

$$\text{rank}(H) \leq \min(N_T, N_R)$$ [Equation 11]

If the matrix is eigenvalue-decomposed, its rank may be defined as the number of non-zero eigenvalues. Similarly, in case of Singular Value Decomposition (SVD), the rank may be defined as the number of non-zero singular values. Therefore, the rank of a channel matrix physically means the maximum number of different pieces of information that can be transmitted on given channels.

Multi-User-MIMO (MU-MIMO) Operation

MU-MIMO is a scheme by which a BS including multiple antennas simultaneously provides a service to a plurality of users (UEs). When one BS simultaneously provides a service to a plurality of UEs, a signal transmitted to a UE may interfere with a signal delivered to another UE, deteriorating system performance. Accordingly, it is necessary to eliminate interference between UEs to successfully transmit/received data according to MU-MIMO. To achieve this, the BS can perform signal processing on signals to be transmitted to a plurality of UEs according to an interference cancellation technique.

The BS can encode information blocks to be delivered to UEs into independent codewords. The encoded codewords can be transmitted according to the interference cancellation technique. For example, the BS can cancel interference in advance for codewords transmitted from the BS to a plurality of UEs. When a signal transmitted to a UE $U_1$ is pre-subtracted from a signal transmitted to another UE $U_2$, the UE $U_2$ can receive the signal from the BS as if there is no interference, and thus additional interference cancellation need not be performed. ZF-DPC (Zero Forcing-Dirty Paper coding), ZF (Zero Forcing) or the like can be used as an interference cancellation technique.

ZF-DPC is described first. When it is assumed that two UEs $U_1$ and $U_2$ are simultaneously provided with a service from a BS, a composite channel of a channel h1 of the UE $U_1$ and a channel h2 of the UE $U_2$ may be H=[h1 h2]. The composite channel H can be decomposed into a lower triangular matrix L and an orthogonal matrix Q, as represented by Equation 12, through LQ decomposition.

$$H = LQ = \begin{bmatrix} l_{11} & 0 \\ l_{21} & l_{22} \end{bmatrix} \begin{bmatrix} q_{11} & q_{12} \\ q_{21} & q_{22} \end{bmatrix}$$ [Equation 12]

When MIMO transmission is performed using columns of the matrix Q of Equation 12 as a beamforming vector, only the lower triangular matrix L remains in a signal received by a UE. If the BS knows channel environments of both the UEs, it is possible to perform encoding in such a manner that a component encoded without interference of the first row is transmitted avoiding an interference component of the second row. When a beamforming vector $w_i$ for each UE is $w_i = q_i$ (i.e. the beamforming vector for $U_1$ is $W_1$ and a beamforming vector for $U_2$ is w), an effective channel can be represented by Equation 13. Accordingly, a signal from which interference from a signal transmitted to another UE has been subtracted can be transmitted to a UE, and thus the UE can successfully receive the signal from the BS without additional interference cancellation operation.

$$h_i w_k = \begin{cases} l_{ii} & i = k \\ 0 & i \neq k \end{cases}$$ [Equation 13]

In the case of ZF beamforming, interference cancellation can be performed through pseudo-inverse of the composite channel H for multiple UEs, as represented by Equation 14.

$$F = H^H (HH^H)^{-1}$$ [Equation 14]

In Equation 14, $X^H$ denotes a Hermitian matrix of a matrix X and $X^{-1}$ denotes an inverse matrix of the matrix X. Each column of the matrix F of Equation 14 corresponds to a beamforming vector for each UE. That is, $w_i = f_i$. In this case, an effective channel for each UE can be represented by Equation 15.

$$h_i w_k = \begin{cases} \dfrac{1}{\|w_i\|} & i = k \\ 0 & i \neq k \end{cases}$$ [Equation 15]

When ZF is used, a channel of each UE takes in the form of an identity matrix, and thus each UE can receive a signal from which interference has been cancelled in advance.

Relay Node

A relay node can be used for extension of high data rate coverage, improvement of group mobility, deployment of a temporary network, improvement of cell edge throughput and/or provision of network coverage to a new area, for example.

Referring back to FIG. 1, the relay node 120 forwards data transmitted/received between the eNB 110 and the UE 132. Two links having different attributes (a backhaul link and an access link) are applied to carrier frequency bands. The eNB 110 may include a donor cell. The relay node 120 can be wirelessly linked to a wireless access network through the donor cell.

A backhaul link between the eNB 110 and the relay node 120 can be represented as a backhaul downlink when the backhaul link uses a downlink frequency band or a downlink subframe resource and represented as a backhaul uplink when the backhaul link uses an uplink frequency band or an uplink subframe resource. Here, a frequency band is a resource allocated in an FDD (Frequency Division Duplex) mode and a subframe is a resource allocated in a TDD (Time Division Duplex) mode. Similarly, an access link between the relay node 120 and the UE 132 can be represented as an access downlink when the access link uses a downlink frequency band or a downlink subframe resource and represented as an access uplink when the access link uses an uplink frequency band or an uplink subframe resource. FIG. 1 shows set-up of a backhaul uplink/downlink and an access uplink/downlink of an FDD mode relay node.

A BS needs to perform uplink reception and downlink transmission and a UE needs to perform uplink transmission and downlink reception. A relay node needs to perform backhaul uplink transmission to a BS, access uplink reception from a UE, backhaul downlink reception from the BS and access downlink transmission to the UE.

When a relay node uses a band (or spectrum), a case in which a backhaul link and an access line operate in the same frequency band is called 'in-band' and a case in which a backhaul link and an access link operate in different frequency bands is called 'out-band'. In both in-band and out-band cases, a UE (referred to as a legacy UE hereinafter) operating according to the legacy LTE system (e.g. release-8) needs to access a donor cell.

A relay node can be classified into a transparent relay node or a non-transparent relay node according to whether a UE recognizes the relay node. 'Transparent' means a case in which a UE does not recognize whether communication with a network is performed through a relay node and 'non-transparent' means a case in which a UE recognizes whether communication with a network is performed through a relay node.

A relay node can be classified into a relay node configured as part of a donor cell and a relay node controlling a cell in terms of control of the relay node.

While a relay node configured as part of a donor cell can have a relay node identifier (ID), this relay node does not have cell identity. If at least part of RRM (Radio Resource Management) of a relay node is controlled by a BS belonging to a donor cell (even if the remaining part of RRM is located in the relay node), the relay node is regarded as a relay node configured as part of the donor cell. For example, smart repeaters, decode-and-forward relays, L2 (second layer) relays and type-2 relays correspond to the relay node configured as part of a donor cell.

The relay node controlling a cell controls one or more cells. Physical layer cell identity is provided to each of cells controlled by the relay node, and the cells can use the same RRM mechanism. From the viewpoint of a UE, there is no difference between accessing a cell controlled by the relay node and accessing a cell controlled by a general BS. A cell controlled by the relay node can support a legacy UE. For example, self-backhauling relays, L3 (third layer) relays, type-1 relays and type-1a relays correspond to the cell-controlling relay node.

A type-1 relay is an in-band relay node that controls a plurality of cells. These cells are considered to be independent cells discriminated from a donor cell from a viewpoint of a UE. Each of the plurality of cells has a physical cell ID (defined in LTE release-8), and the relay node can transmit a synchronization channel, a reference signal, etc. thereof. In the case of single-cell operation, a UE can directly receive scheduling information and HARQ feedback from a relay node and transmit a control channel (scheduling request (SR), CQI, ACK/NACK, etc.) thereof to the relay node. Legacy UEs (UEs operating according to LTE release-8 system) regard the type-1 relay as a legacy BS. That is, the type-1 relay has backward compatibility. The type-1 relay is regarded by UEs operating according to LTE-A as a BS different from the legacy BS, and thus the type-1 relay can provide performance improvement.

A type-1a relay has the same characteristics as those of the type-1 relay except that the type-1a relay operates as an out-band relay. Operation of the type-1a relay can be configured to minimize or eliminate effects on L1 (first layer) operation.

A type-2 relay is an in-band relay that does not have a physical cell ID, and thus the type-2 relay does not generate a new cell. The type-2 relay is transparent for legacy UEs, and the legacy UEs cannot recognize presence of the type-2 relay. While the type-2 relay can transmit a PDSCH, it does not transmit a CRS and a PDCCH.

Hybrid Automatic Retransmission Request (HARQ) Operation

The following HARQ operation can be applied as a method for controlling data reception failure. When a data transmitter receives an ACK signal from a data receiver after transmitting a packet to the data receiver, the data transmitter can transmit a new packet. If the data transmitter receives a NACK signal from the data receiver, the data transmitter can retransmit the previously transmitted packet. In this case, a packet to which encoding according to forward error correction (FEC) has been applied can be retransmitted. Accordingly, the data receiver decodes a received packet and transmits an ACK signal when successfully decoding the received packet. When the data receiver does not successfully decode the received packet, the data receiver transmits a NACK signal and stores the received packet in a buffer. Upon reception of a retransmitted packet according to the NACK signal, the data receiver combines the retransmitted packet with the packet stored in the buffer and decodes the combined packet to improve a packet reception success rate.

HARQ can be classified into synchronous HARQ and asynchronous HARQ according to retransmission timing. In synchronous HARQ, when initial transmission fails, retransmission is performed at a time determined by the system. For example, when it is determined that retransmission is performed every fourth time unit (e.g. subframe) from when initial transmission fails, it is not necessary to additionally inform a receiver of information about retransmission timing. Accordingly, if a data transmitter receives a NACK signal, the data transmitter retransmits a packet every fourth time unit until an ACK signal is received. According to asynchronous HARQ, information about retransmission timing is additionally scheduled. Accordingly, packet retransmission timing corresponding to a NACK signal can be varied according to various conditions such as channel state, etc.

HARQ can be classified into adaptive HARQ and non-adaptive HARQ according to whether channel state is reflected in the quantity of resources used for retransmission. In non-adaptive HARQ, an MCS level of a retransmitted packet, the number of used resource blocks, etc. determined during initial transmission is not varied. For example, if a transmitter transmits data using 8 resource blocks during initial transmission, the transmitter retransmits data using 8 resource blocks during retransmission. In adaptive HARQ, a packet modulation scheme and the number of used resource blocks vary with channel state. For example, even when transmission is initially performed using 8 resource blocks, retransmission can be performed using more or less than 8 resource blocks.

In data packet transmission through HARQ, a transmitter can segment a data packet into sub-packets each having a predetermined size and transmit or retransmit the sub-packets. A receiver can combine the sub-packets received from the transmitter into the data packet and attempt to decode the data packet.

A plurality of sub-packets used for initial transmission and retransmission according to HARQ is generated from one codeword packet. The generated sub-packets can be discriminated using a sub-packet length and a sub-packet start point. A sub-packet that can be discriminated is called a redundancy version (RV). A receiver can attempt to decode a whole codeword by receiving different RVs and combining the received RVs. For example, a HARQ operation can be performed in such a manner that only sub-packets corresponding to a difference between a whole codeword packet and a previously received sub-packet are received and decoding of the codeword packet is attempted. This method is an incremented redundancy IR HARQ operation.

Partial Signal Relaying Through Relay Node in Multi-User Environment

Figure 7:
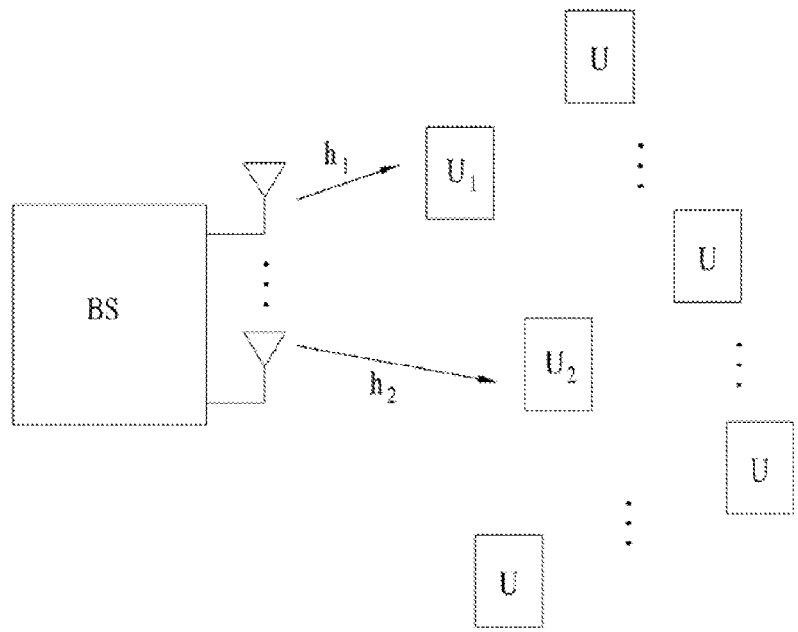
FIG. 7 is a conceptual view for explaining a multi-user environment.
Figure 7:
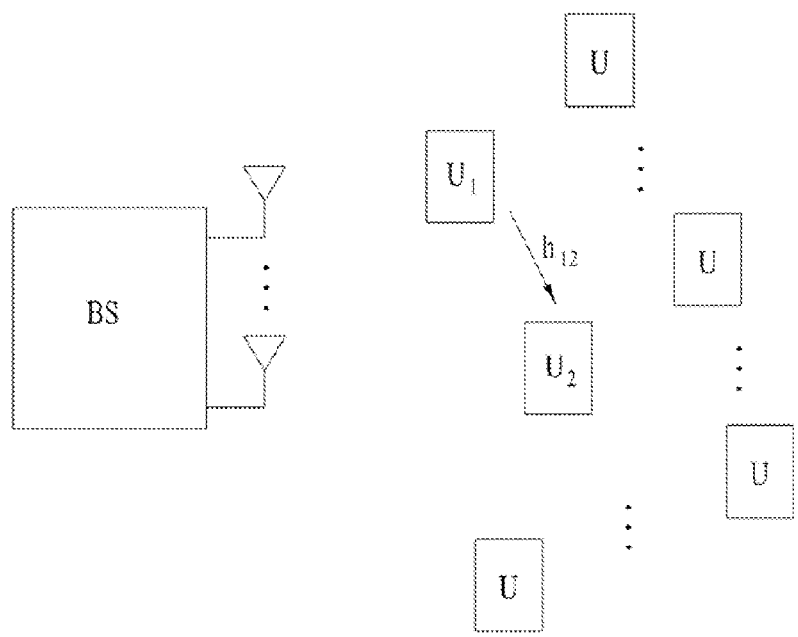

FIG. 7 is a conceptual view for explaining a multi-user environment. In FIG. 7, it is assumed that a BS includes multiple antennas and can support MU-MIMO transmission and each of UEs $U_1$ and $U_2$ includes a single antenna. However, this assumption is for clarity of description and the principle of the present invention, described below, can be equally applied to a UE including multiple antennas.

Referring to FIG. 7($a$), a plurality of UEs $U_1$ and $U_2$ can simultaneously receive signals from the BS. A channel to the UE $U_1$ is denoted by $h_1$ and a channel to the UE $U_2$ is denoted by $h_2$. It is assumed that the UE $U_1$ has a good channel state since the UE $U_1$ is close to the BS whereas the UE has a poor channel state because the UE $U_2$ is located at a cell edge. While the BS can transmit a signal with higher power to a UE having a poor state in order to ensure data transmission for the UE, interference may occur. To solve this problem, relays of various types, as described above, can be introduced. However, since installation of a new relay node in a network requires additional resources, a scheme in which a UE in a good channel state from among a plurality of UEs functions as a relay node can be considered. This relay node is called a UE-relay. The UE-relay can correspond to the type-2 relay. That is, the UE-relay is transparent for a UE which receives data.

FIG. 7($b$) shows that the UE $U_1$ functions as a UE-relay and the UE $U_2$ receives data from the BS through the UE $U_1$. In this manner, throughput and resource utilization efficiency can be improved by performing data transmission through cooperation between UEs in the multi-user environment. For example, the UE $U_1$ having a satisfactory channel environment with respect to the BS, compared to other UEs, can serve as a UE-relay and aid in transmission of data to the UE $U_2$ having a poor channel state. Specifically, the UE $U_1$ can simultaneously receive data destined therefor and data to be delivered to the UE $U_2$ from the BS. The UE $U_1$ can forward to the UE $U_2$ data destined for the UE $U_2$ from among the received data. The UE $U_2$ can acquire data destined therefor through data directly received from the BS and data received via the UE $U_1$. This data transmission scheme can be called partial signal relaying.

To perform information relay using a user-relay in the multi-user environment as described above, it is necessary for the BS to determine a method for encoding information bits to be delivered to each UE. A description will be given of an information bit encoding method performed by a BS and an information relaying operation through a user-relay according to various embodiments of the present invention.

Figure 8:
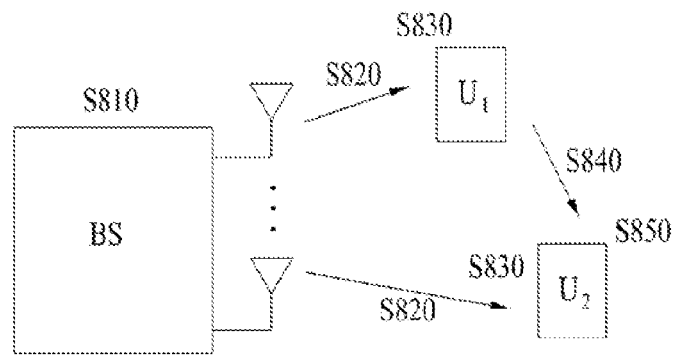
FIG. 8 illustrates an operation of delivering information through a user-relay in a multi-user environment.

FIG. 8 illustrates an operation of forwarding information through a user-relay in a multi-user environment. FIG. 8 does not show UEs other than $U_1$ and $U_2$ in the multi-user environment for clarity of description. However, the present invention is not limited to the two UEs $U_1$ and $U_2$ and the principle of the present invention can be equally applied to a case in which MU-MIMO transmission is performed for two or more UEs and one of the UEs serves as a user-relay for the other UE(s). In FIG. 8, $U_1$ denotes a UE functioning as a user-relay and $U_2$ denotes a UE corresponding to a destination of information transmission. $U_2$ may be called a destination user.

Referring to FIG. 8, a BS encodes data destined for the UEs $U_1$ and $U_2$ (S810), transmits the encoded data to the UEs $U_1$ and $U_2$ (S820), restores data received from the UE $U_1$ (S830), and transmits, to the UE $U_2$, data relating to the UE $U_2$ from among the restored data (S840). The UE $U_2$ can restore data destined therefor using the data received in steps S820 and S840 (S850). Detailed operations of the steps will now be described.

Step S810 is a data encoding step. The BS can encode data destined for the UE $U_1$ serving as a user-relay and data destined for the destination user $U_2$ to which information will be delivered through the UE $U_1$. Specifically, data encoding can be performed for each UE, as illustrated in FIG. 9.

Figure 9:
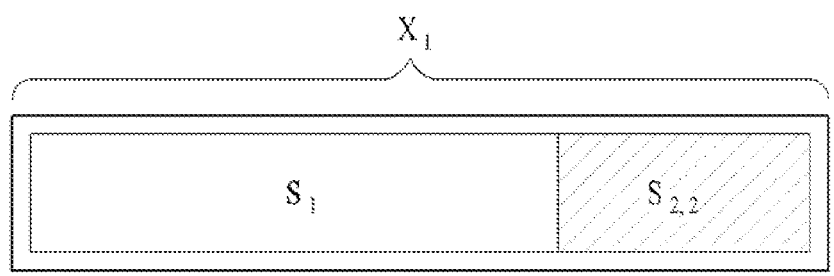
FIG. 9 shows data encoded according to a bit concatenation based partial signal relaying scheme.
Figure 9:
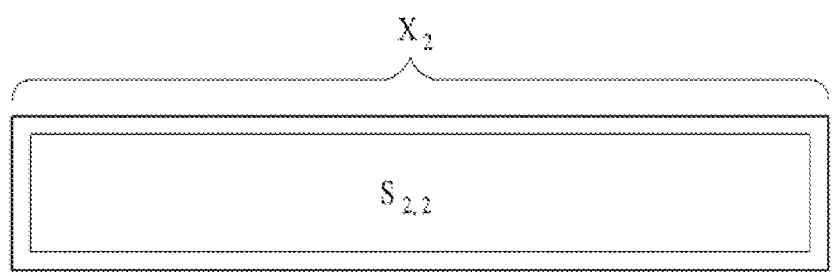

FIG. 9($a$) shows data encoded for the UE $U_1$ and FIG. 9($b$) shows data encoded for the UE $U_2$. $S_1$ denotes an information bit for the UE $U_1$ and $S_2$ denotes an information bit for the UE $U_2$. $S_2$ is divided into an information bit $S_{2,1}$ directly transmitted to the UE $U_2$ from the BS through a channel $h_2$ and an information bit $S_{2,2}$ delivered through a channel $h_{12}$ from the user-relay $U_1$. For example, $S_{2,2}$ can be composed of part of the information bit $S_{2,1}$ (that is, $S_{2,2}$ and part of $S_{2,1}$ overlap) or composed of an information bit discriminated from $S_{2,1}$ (that is, $S_{2,1}$ and $S_{2,2}$ do not overlap). For example, $S_{2,1}$ can correspond to a systematic bit and $S_{2,2}$ can correspond to a parity bit. Otherwise, $S_{2,1}$ and $S_{2,2}$ can respectively correspond to a first part and a second part obtained by partitioning an output $S_2$ from a channel coder (that is, one of partitions of $S_2$ corresponds to $S_{2,1}$ and the other corresponds to $S_{2,2}$).

As shown in FIG. 9($a$), the information bit $S_{2,2}$ for the UE $U_2$ can be concatenated with the information bit $S_1$ for the UE $U_1$ and encoded into one codeword. This encoding scheme can be called bit concatenation. The partial signal relaying scheme proposed by the present invention can be called a bit concatenation based partial signal relaying scheme.

Referring to FIG. 9($b$), $S_1$ and $S_{2,2}$ can be concatenated with each other and represented as a single encoded codeword $X_1$. Proportions of $S_1$ and $S_{2,2}$ in codeword X1 can be $(1-\alpha)$ and $\alpha (0 \le \alpha \le 1)$. If the same transmit power is set for $S_1$ and $S_{2,2}$, $(1-\alpha)$ and $\alpha$ may correspond to transmit power proportions.

Referring to FIG. 9($b$), the information bit $S_{2,1}$ for $U_2$ can be encoded into an independent codeword $X_2$.

In step S820, the BS can respectively transmit the codewords $X_1$ and $X_2$ encoded in step S810 to the UEs $U_1$ and $U_2$. Step S820 may be represented as a step in which the BS broadcasts data to the respective UEs in a first transmission phase. When the BS respectively transmits the codewords $X_1$ and $X_2$ to the UEs $U_1$ and $U_2$, interference applied to each UE can be cancelled in advance using an interference cancellation technique such as ZF-DPC or ZF as described above.

Provided that transmit power allocated to the codeword $X_1$ transmitted to the UE $U_1$ is $P_1$ and transmit power allocated to the codeword $X_2$ transmitted to the UE $U_2$ is $P_2$, the sum of $P_1$ and $P_s$ cannot exceed maximum transmit power $P_{BS}$ of the BS.

Signals respectively received by the UEs $U_1$ and $U_2$ in the first transmission phase can be represented by Equation 16.

$$y_1^{(1)} = \sqrt{P_1} h_1 w_1 x_1(s_1, s_{2,2}) + \qquad \text{[Equation 16]}$$
$$\sqrt{P_2} h_1 w_2 x_2(s_{2,1}) + n_1,$$
$$= \sqrt{P_1} h_1 w_1 x_1(s_1, s_{2,2}) + n_1$$
$$y_2^{(1)} = \sqrt{P_1} h_2 w_1 x_1(s_1, s_{2,2}) +$$
$$\sqrt{P_2} h_2 w_2 x_2(s_{2,1}) + n_1$$
$$= \sqrt{P_2} h_2 w_2 x_2(s_{2,1}) + n_1,$$

In Equation 16, $y_1^{(1)}$ and $y_2^{(1)}$ respectively represent signals received at the UEs $U_1$ and $U_2$ in the first transmission phase. $P_1$ and $P_2$ respectively denote transmit powers allocated to the codewords $X_1$ and $X_2$. In addition, $x_1(s_1, s_{2,2})$ represents a codeword obtained by concatenating $s_1$ and $s_{2,2}$ and encoding the concatenated information bits, and $x_2(s_{2,1})$ represents a codeword obtained by encoding $s_{2,1}$. Furthermore, $h_1$ and $h_2$ respectively denote channels between the BS and the UEs $U_1$ and $U_2$ and $w_1$ and $w_2$ respectively denote beamforming vectors for UEs $U_1$ and $U_2$. The beamforming vectors can be determined as described above with respect to ZF-DPC or ZF corresponding to a proactive interference cancellation technique. In Equation 16, $n_1$ and $n_2$ respectively denote additive white Gaussian noise (AWGN) at the UEs $U_1$ and $U_2$.

In step S820, transmission from the BS to the UE $U_1$ and transmission from the BS to the UE $U_2$ may be simultaneously performed or carried out at different times. The above-mentioned first transmission phase represents the order of operations performed in the process of transmitting information to a destination through a user-relay.

In step S830, the UEs $U_1$ and $U_2$ restore (or decode) data from the signals received in the first transmission phase. The UE $U_1$ can decode the codeword $X_1$ from the signal $y_1^{(1)}$ received in the first transmission phase and the UE $U_2$ can decode the codeword $X_2$ from the signal $y_2^{(1)}$ received in the first transmission phase.

In the case of the UE $U_1$, only information corresponding to $(1-\alpha)$ from among the restored information is information destined for the UE $U_1$ and information corresponding to $\alpha$ is information destined for the other UE $U_2$. Accordingly, the quantities of information, which can be respectively acquired by the UEs $U_1$ and $U_2$ as information thereof in the first transmission phase, can be represented by Equation 17.

$$R_1^{(1)} = (1-\alpha)\log(1+P_1\gamma_1),$$
$$R_2^{(1)} = \log(1+P_2\gamma_2), \qquad \text{[Equation 17]}$$

In Equation 17, $\gamma_1$ and $\gamma_2$ respectively represent $|h_1 w_1|^2/N_0$ and $|h_2 w_2|^2/N_0$. Here, $N_0$ denotes variance of $n_1$ and $n_2$ corresponding to AWGNs of the UEs $U_1$ and $U_2$, which are described above with reference to Equation 16.

In step S840, information forwarding is performed in a second transmission phase.

The UE $U_1$ as a user-relay can extract information (i.e. $S_{2,2}$) for the other UE $U_2$, which corresponds to $\alpha$ from the information obtained by restoring the information received from the BS in the first transmission phase. The extracted data $S_{2,2}$ relating to the UE $U_2$ can be forwarded from the UE $U_1$ to the UE $U_2$ in the second transmission phase.

The UE $U_1$ can modulate the extracted data $S_{2,2}$ into $X_R$ and transmit the $X_R$ to the UE $U_2$. Since $X_R$ includes the data $S_{2,2}$ relating to the UE $U_2$, $X_R$ can be represented as $X_R(S_{2,2})$. A modulation method applied to $S_{2,2}$ can be determined by the BS. For example, a modulation technique applied by the UE $U_1$ to the data $S_{2,2}$ to be delivered to the UE $U_2$ can be determined in advance according to previous signal exchange between the BS and the user-relay $U_1$. Otherwise, the codeword $X_1$ generated by the BS by concatenating the data $S_1$ relating to the user-relay $U_1$ and the data $S_{2,2}$ to be delivered to the other UE $U_2$ and encoding the concatenated data may include information that represents a modulation technique applied by the UE $U_1$ to the data $S_{2,2}$ to be delivered to the UE $U_2$.

Furthermore, the user-relay $U_1$ can use maximum transmit power $P_{U_1}$ in order to maximize efficiency of transmission to the destination user $U_2$. In this case, the signal received by the UE $U_2$ can be represented by Equation 18.

$$y_2^{(2)} = \sqrt{P_{U_1}} h_{12} x_R(s_{2,2}) + n_{12}. \qquad \text{[Equation 18]}$$

In Equation 18, $y_2^{(2)}$ represents the signal received by the UE $U_2$ in the second transmission phase. $P_{U_1}$ denotes transmit power allocated to $X_R$. $X_R(S_{2,2})$ represents a signal which has been modulated by the UE $U_1$ from the data $s_{2,2}$ delivered to the UE $U_2$ from the UE $U_1$, and $h_{12}$ denotes a channel from the UE $U_1$ to the UE $U_2$. In addition, $n_{12}$ represents AWGN of the channel $h_{12}$.

The quantity of information acquired by the UE $U_2$ from the signal represented in Equation 18 can be represented by Equation 19.

$$R_2^{(2)} = \log(1+P_{U_1}\gamma_{12}) \qquad \text{[Equation 19]}$$

In Equation 19, $R_2^{(2)}$ represents the quantity of information acquired by the UE $U_2$ in the second transmission phase and $\gamma_{12}$ denotes $|h_{12}|^2/N_0$.

In delivery of the data $S_{2,2}$ from the user-relay $U_1$ to the destination user $U_2$, the second transmission phase can be variably determined according to the quantity of information to be delivered in order to improve information transmission efficiency. When a variable transmission phase is considered, a time required for the user-relay $U_1$ to deliver information can be represented by Equation 20.

$$t^{(2)} = \frac{\alpha \cdot \log(1+P_1\gamma_1)}{\log(1+P_{U_1}\gamma_{12})} \times t^{(1)} \qquad \text{[Equation 20]}$$

In Equation 20, $t^{(1)}$ represents a time taken for the first transmission phase and $t^{(2)}$ represents a time taken for the second transmission phase. The time required for the second transmission phase, relative to the time required for the first transmission phase, can be determined according to the ratio of the quantity of information, $\alpha \cdot \log(1+P_1\gamma_1)$, which corresponds to data for the destination user $U_2$ transmitted during the first transmission phase and acquired by the user-relay $U_1$ from the BS, to the quantity of information, $\log(1+P_{U_1}\gamma_{12})$, which corresponds to data transmitted during the second transmission phase and acquired by the destination user $U_2$ from the user-relay $U_1$. Provided that the time taken for the first transmission phase corresponds to 4 subframes and (the quantity of information corresponding to data for the destination user $U_2$, acquired by the user-relay $U_1$ in the first transmission phase)/(the quantity of information corresponding to data acquired by the destination user $U_2$ in the second transmission phase)=½, 2 subframes are required for the second transmission phase. In this case, the acquired quantity of information may be varied according to states of channels ($h_1$ and/or $h_{12}$), and thus the time taken for the second transmission phase can be variably determined.

When the time required for the first transmission phase and the time required for the second transmission phase are fixed, the size of a frequency resource used for information forwarding may be variably determined. That is, the size of a frequency resource to be used in the second transmission phase can be variably determined similarly to the above-described variable transmission time. For example, if a frequency resource used in the first transmission phase (i.e. a frequency resource used to transmit $S_1$ and $S_{2,2}$) corresponds to 10 resource blocks (RBs) and (the quantity of information corresponding to data for the destination user $U_2$, acquired by the user-relay $U_1$ in the first transmission phase)/(the quantity of information corresponding to data acquired by the destination user $U_2$ in the second transmission phase)=½, a frequency resource used in the second transmission phase can be set to 5 RBs. In this case, the acquired quantity of information may be varied according to states of channels ($h_1$ and/or $h_{12}$), and thus the frequency resource used in the second transmission phase can be variably determined.

Here, the data $S_{2,2}$ forwarded by the user-relay UE $U_1$ to the destination user $U_2$ corresponds to an information bit generated and encoded by the BS and the user-relay $U_1$ does not perform processing other than the above-mentioned modulation and delivery on the data $S_{2,2}$. That is, the user-relay $U_1$ just forwards the data $S_{2,2}$ for the other UE $U_2$, received from the BS, to the UE $U_2$.

In step S850, the UE $U_2$ restores (or decodes) data destined therefor using the signal received in the first transmission phase and the signal received in the second transmission phase.

The user-relay $U_1$ receives data only in the first transmission phase, whereas the destination user $U_2$ receives data in both the first transmission phase and the second transmission phase. The destination user $U_2$ can restore the data destined therefor by concatenating the signal $y_2^{(1)}$ received in the first transmission phase and the signal $y_2^{(2)}$ received in the second transmission phase and joint-decoding the concatenated signals.

Accordingly, data throughputs per unit time in the UEs $U_1$ and $U_2$ can be represented by Equation 21.

$$C_1(\alpha, P_1) = \frac{t^{(1)}}{t^{(1)} + t^{(2)}} R_1^{(1)}$$ [Equation 21]
$$= \frac{t^{(1)}}{t^{(1)} + t^{(2)}} (1-\alpha) \log(1 + P_1 \gamma_1),$$

$$C_2(\alpha, P_1 P_2) = \frac{t^{(1)}}{t^{(1)} + t^{(2)}} R_2^{(1)} + \frac{t^{(2)}}{t^{(1)} + t^{(2)}} R_2^{(2)}$$
$$= \frac{t^{(1)}}{t^{(1)} + t^{(2)}} \log(1 + P_2 \gamma_2) + \frac{t^{(2)}}{t^{(1)} + t^{(2)}} \log(1 + P_{U_1} \gamma_{12})$$
$$= \frac{t^{(1)}}{t^{(1)} + t^{(2)}} \{\log(1 + P_2 \gamma_2) + \alpha \cdot \log(1 + P_1 \gamma_1)\}.$$

In Equation 21, $C_1$ and $C_2$ respectively denote throughputs with respect to the UEs $U_1$ and $U_2$. $P_1$, $P_2$ and $\alpha$ can be determined according to the required quantity of information. That is, the BS can determine the transmit powers $P_1$ and $P_2$ for the UEs $U_1$ and $U_2$ and a proportion of data to be forwarded to the destination user $U_2$ in the data delivered to the user-relay $U_1$.

Data received by the destination user $U_2$ in the first transmission phase is $S_{2,1}$ and data received by the destination user $U_2$ from the user-relay $U_1$ in the second transmission phase is $S_{2,2}$. As described above, $S_{2,2}$ may be composed of some of the information bit $S_{2,1}$ (that is, $S_{2,2}$ and part of $S_{2,1}$ overlap).

In this case, since destination user $U_2$ performs data decoding using redundant information, a decoding success rate can be increased in the case of a poor channel state, compared to a case in which data is directly received from only the BS, and more robust data restoration can be achieved. Alternatively, $S_{2,2}$ may be composed of an additional information bit discriminated from $S_{2,1}$ (that is, $S_{2,1}$ and $S_{2,2}$ do not overlap). In this case, the destination user $U_2$ receives an appropriate quantity of data through the direct channel from the BS and the channel from the user-relay, and thus the quantity of received information can be increased.

In the above-described partial signal relaying scheme through a user-relay in a multi-user environment, it is possible to improve throughput by forwarding data (or part of data) for a UE ($U_2$) having a relatively poor channel state via a UE ($U_2$) having a relatively good channel state. The UE $U_1$ in a good channel state can use remaining channel capacity to forward the data for the other UE $U_2$ while satisfying the quantity of information allocated to the UE $U_1$. Here, because the data for the other UE $U_2$ is concatenated with the data for the UE $U_1$ having a good channel state and delivered as a single codeword, information restoration can be performed without interference. Furthermore, as a variable transmission time is considered in a data forwarding process, a time used for information forwarding decreases and throughput increases when the channel between the UEs is in a sufficiently satisfactory state. Since the UE $U_2$ in a poor channel state receives the data destined therefor through the direct channel from the BS and the channel from the user-relay, the quantity of received information can be increased and/or a decoding success rate can be improved.

The present invention is applicable to a multi-user environment using multiple antennas. Furthermore, the present invention can secure quality of service (QoS) of UEs having poor channel states, located at a cell edge, by allowing all UEs to serve as a relay node as necessary without using an additional relay node. Moreover, in HARQ data retransmission, the BS delivers a retransmitted data packet to the destination user together with data of the relay-user using the partial signal relaying scheme, and thus the user-relay instead of the BS can directly forward the retransmitted data packet to the destination user.

HARQ Operation Through a User-Relay

A user-relay refers to a UE that helps another UE, and cooperative communication through the user-relay may be referred to as cooperative communication between UEs. The user-relay may correspond to the above-mentioned type-2 relay.

When the user-relay is used, a destination node (or destination user) cannot recognize the user-relay. Accordingly, previous information exchange is not performed between the user-relay and the destination node and the destination node does not report feedback about a channel state to the relay-node. That is, the user-relay transmits data to the destination node without information about a channel between the user-relay and the destination node. In other words, data transmission from the user-relay to the destination node needs to be performed in an open-loop manner.

When partial signal relaying through the user-relay is applied, while channels $h_1$ and $h_2$ from a source node (BS) to respective UEs can be determined according to channel state information feedback reported by each UE, the channel $h_{12}$ between the user-relay $U_1$ and the destination node $U_2$ can be determined according to average characteristics of the channel rather than reflecting an actual channel environment.

When partial signal relaying through the user-relay is performed in the open-loop manner, there is a probability that outage occurs and HARQ retransmission may be applied in order to correct an error generated due to the outage. A description will be given of a resource allocation method capable of obtaining a maximum transmission rate and a HARQ operation when data delivery through a user-relay is performed in an open-loop manner according to embodiments of the present invention.

In the following embodiments of the present invention, the bit concatenation based partial signal relaying scheme proposed by the present invention can be applied as a partial signal relaying method through a user-relay. Otherwise, a general partial signal relaying method can be applied.

The general partial signal relaying method refers to a method by which a source node transmits as much data as can be directly delivered to a destination node in consideration of a channel state and a relay node additionally delivers data to the destination node. The data to be delivered from the relay node to the destination node is provided by the source node. In this case, the source node may directly transmit the data to the relay node or the relay node may overhear data transmitted from the source node to the destination node.

A successive interference cancellation (SIC) based partial signal relaying method is exemplified. According to the SIC based partial signal relaying method, a signal can be transmitted from the source node to the destination node as described in the following.

Figure 10:
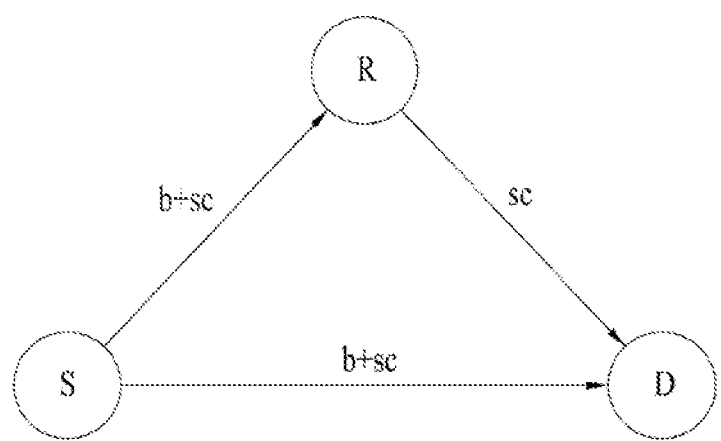
FIG. 10 illustrates a successive interference cancellation (SIC) based partial signal relaying operation.

FIG. 10 is a view for explaining an SCI based partial signal relaying operation.

A source node S performs superposition coding on a basic layer b and a superposed layer sc and simultaneously transmits the superposition-coded basic layer and superposed layer to a relay node R and a destination node D. The basic layer b corresponds to a part directly transmitted from the source node to the destination node and the superposed layer sc corresponds to a part delivered to the destination node via the relay node. When the source node performs superposition coding, the ratio of signal power of the basic layer b to signal power of the superposed layer sc can be determined using channel information between the source node and the relay node and channel information between the source node and the destination node.

The relay node can detect the superposed layer sc by detecting the basic layer b from a signal received from the source node and erasing the basic layer b. The relay node can forward the superposed layer sc to the destination node.

The destination node can receive and detect the superposed layer sc forwarded from the relay node and erase the detected superposed layer sc from a signal b+sc received from the source node so as to detect the basic layer b.

A total transmission rate $R_{tot}$ that can be obtained according to the SIC based partial signal relay operation is represented by Equation 22.

$$R_b = \min\left[\log(1 + (1-\alpha)\gamma_{sd}), \log\left(1 + \frac{(1-\alpha)\gamma_{sr}}{1+\alpha\gamma_{sr}}\right)\right]$$ [Equation 22]

$$R_s = \log(1 + \alpha\gamma_{sr})$$

$$R_2 = \log(1 + \gamma_{rd})$$

$$R_{tot} = \frac{R_b + R_s}{1 + R_s/R_2}$$

In Equation 22, $R_b$ denotes a transmission rate for the basic layer b, $R_s$ denotes a transmission rate for the superposed layer, and $R_2$ represents a transmission rate between the relay node and the destination node. $\gamma$ represents a signal-to-noise ratio (SNR) with respect to each channel. $\gamma_{sd}$ represents SNR with respect to the channel between the source node S and the destination node D, $\gamma_{sr}$ represents SNR with respect to the channel between the source node S and the relay node R, and $\gamma_{rd}$ denotes SNR with respect to the channel between the relay node R and the destination node D. In addition, $\alpha$ denotes the ratio of the basic layer b to the superposed layer sc, and $(1-\alpha)$ is allocated to the basis layer b and $\alpha$ is allocated to the superposed layer sc.

In Equation 22, the basic layer b is detected by both the relay node and the destination node, and thus the transmission rate $R_b$ for the basic layer b is determined as a smaller one of the transmission rate for the relay node and the transmission rate for the destination node. A time taken to transmit the superposed layer sc from the relay node to the destination node is determined by the ratio of $R_s$ to $R_2$.

To reduce the quantity of information delivered from the relay node to the destination node and a transmission time taken to transmit information from the relay node to the destination node and improve the total transmission rate $R_{tot}$, the source node can perform rate control. In this case, rate control can be performed on the basis of channel information between the source node and the relay node, channel information between the source node and the destination node, and channel information between the relay node and the destination node. As described above, the SIC partial signal relaying method can increase the total transmission rate by designating rate capacity between the relay node and the destination node to determine a time taken to deliver information from the relay node to the destination node when the source node knows information about all channels. That is, the SIC partial signal relaying method can improve the total transmission rate through accurate rate control in a closed-loop environment.

However, in a cooperative communication environment through a user-relay as described above, the destination node cannot recognize presence of the user-relay and feedback about a channel state is not reported. That is, the relay node transmits data to the destination node in an open-loop manner without information about the channel between the relay node and the destination node. In this case, since the source node cannot measure rate capacity between the user-relay and the destination node, it is difficult for the source node to determine a transmission rate in advance and signal the transmission rate to the relay node.

The present invention proposes a method for obtaining a maximum transmission rate in cooperative communication through a user-relay in an open-loop environment. Specifically, the source node proactively allocates optimum resources (time resource and/or frequency resource) to be used to deliver data from the relay node to the destination node in consideration of outage probability according to average characteristics of the channel between the user-relay and the destination node in the open-loop environment such that the relay node performs transmission/retransmission. Alternatively, the source node may designate a resource to be used for data transmission/retransmission between the relay node and the destination node and signal the resource to the relay node before transmission/retransmission.

The bit concatenation based partial signal relaying method, proposed by the present invention, the above-described SIC partial signal relaying method or a general partial signal relaying method can be used as the partial signal relaying scheme through a user-relay. While the SIC partial relaying method in an open-loop environment is exemplified in the following description, the present invention is not limited thereto and the principle of the present invention can be applied to various partial signal relaying methods.

Since there is a probability that outage occurs between the relay node and the destination node in the partial signal relaying method in the open-loop environment, it is possible to consider support for HARQ transmission/retransmission for error correction. In this HARQ operation, the destination node can correct an error by combining accumulated data sub-packets and attempting to decode the combined sub-packets according to an IR scheme.

A description will be given of a method by which the source node controls a transmission rate on the basis of outage probability and designates optimum resources that maximize the total transmission rate while satisfying outage constraint according to time-variant channel characteristics in each transmission phase in HARQ data transmission/retransmission in an open-loop environment between the user-relay and the destination node. Particularly, the source node can allocate scheduling information for data delivery from the relay node to the destination node on the basis of outage probability and also assign scheduling information for HARQ retransmission when data delivery from the relay node to the destination node fails. The scheduling information may include the location and/or quantity of time and/or frequency resource, a modulation and coding scheme to be applied to transmission/retransmission, etc.

When scheduling information for retransmission of the relay node is designated by the source node, if the destination node fails to decode data and thus transmits a NACK signal to the source node, the relay node can overhear the NACK signal and retransmit data sub-packets to the destination node according to the retransmission scheduling information designated by the source node. Even if the source node receives a NACK signal regarding data to be transmitted from the relay node to the destination node, the source node does not perform retransmission. If the destination node successfully decodes data and thus transmits an ACK signal to the source node, the relay node does not use a resource for retransmission, which is designated by the source node, upon overhearing the ACK signal. Upon reception of the ACK signal, the source node can transmit new data.

As described above, the method by which the source node designates a resource to be used for transmission/retransmission of the relay node can be applied to a case in which the relay node corresponds to a type-2 relay (e.g. the above-described user-relay).

Figure 11:
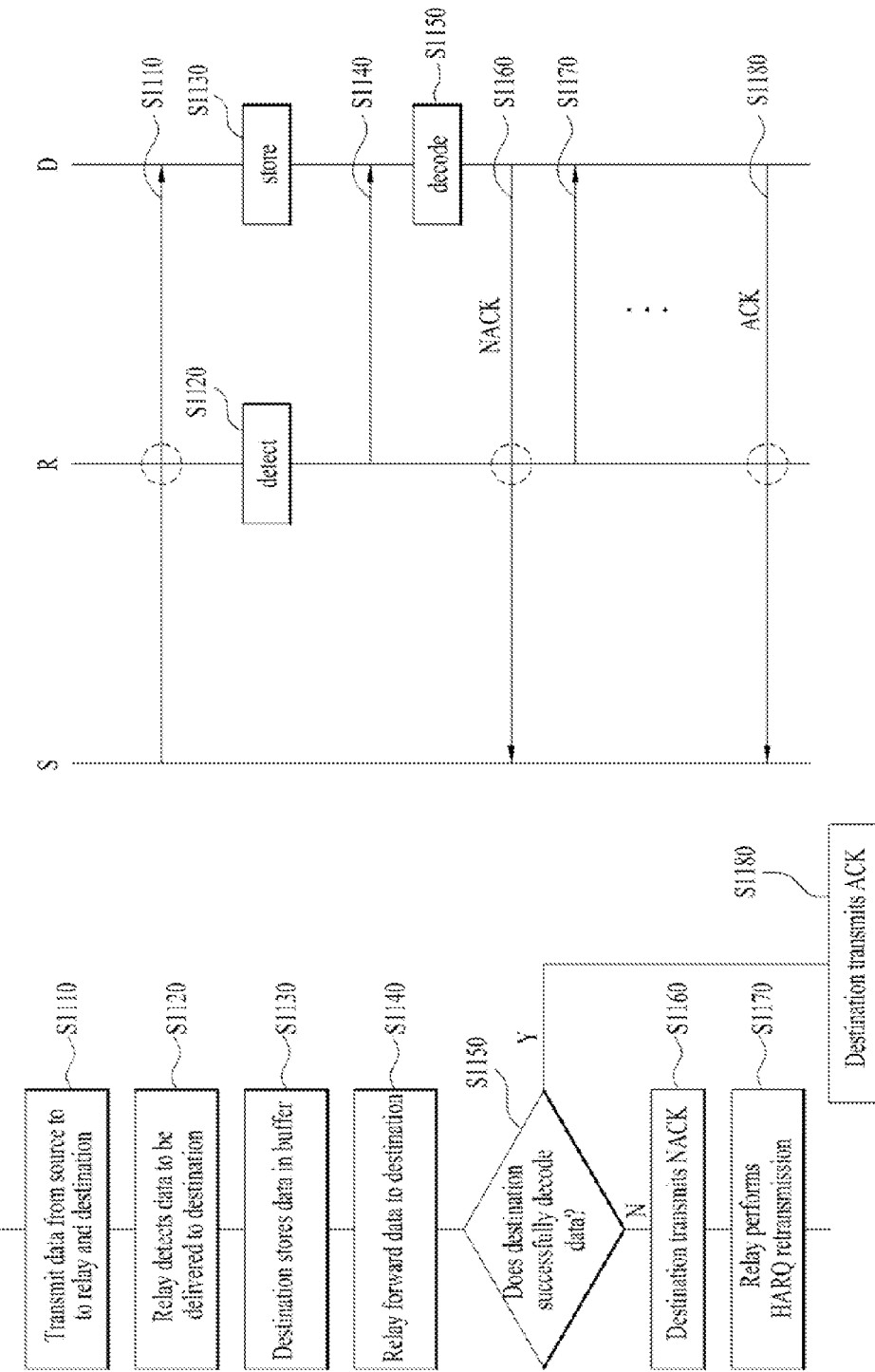
FIG. 11 is a flowchart illustrating an operation of transmitting/retransmitting data through a relay node according to a partial signal relaying scheme.

FIG. 11 is a flowchart illustrating data transmission/retransmission through a relay node in the partial signal relaying method.

In step S1110, the source node S can transmit data to the relay node R and the destination node D.

Some data transmitted to the relay node in step S1110 may include data delivered to the destination node. According to the above-described bit concatenation based partial signal relaying method, for example, the data transmitted to the relay node may be data obtained by encoding data $S_1$ for the relay node and data $S_{2,2}$ for the destination node according to bit concatenation. Alternatively, according to the above-described SIC partial signal relaying method, the data transmitted to the relay node may be data obtained by superposition-coding a basic layer and a superposed layer b+sc.

For example, the data transmitted to the destination node in step S1110 can correspond to the data $S_{2,1}$ for the destination node according to the bit concatenation based partial signal relaying method and correspond to the data obtained by superposition-coding the basic layer and the superposed layer b+sc according to the SIC partial signal relaying method.

If the same data is transmitted to the relay node and the destination node in step S1110, the relay node can overhear the data transmitted from the source node to the destination node. In step S1110, a circle represented by a dotted line indicates that the relay node can overhear the data transmitted from the source node to the destination node. Alternatively, the source node can broadcast data to the relay node and the destination node. Otherwise, the source node may separately transmit data to the relay node and the destination node in step S1110.

In step S1120, the relay node can detect data to be forwarded to the destination node from the data received in step S1110. According to the bit concatenation based partial signal relaying method, for example, the relay node can detect the data $S_{2,1}$ for the destination node. According to the SIC partial signal relaying method, the relay node can detect the superposed layer sc.

In step S1130, the destination node can store the data received in step S1110 in a buffer.

In step S1140, the relay node can forward data to the destination node. For example, the data forwarded by the relay node to the destination node may correspond to the data $S_{2,2}$ for the destination node according to the bit concatenation based partial signal relaying method and correspond to the superposed layer sc according to the SIC partial signal relaying method.

Scheduling information used to determine a transmission resource, transmission rate, modulation and coding scheme used for the relay node to transmit the data to the destination node in step S1140 may be designated by the source node in advance. Alternatively, the source node may transmit the scheduling information to the relay node before the forwarding operation of the relay node. A method by which the source node determines the scheduling information to be applied to data forwarding of the relay node will be described below in detail.

In step S1150, the destination node can attempt to decode data on the basis of the data received from the source node in step S1110 and the data received from the relay node in step S1140. According to the bit concatenation based partial signal relaying method, for example, the destination node can detect whether data destined therefor has been received without error by concatenating the data $S_{2,1}$ received from the source node and the data $S_{2,2}$ forwarded from the relay node and joint-decoding the concatenated data. According to the SIC partial signal relaying method, the destination node can detect the basic layer b by erasing the superposed layer sc received from the relay node from the data b+sc obtained by superposition-coding the basic layer and the superposed layer, which is received from the source node.

In step S1160, the destination node can generate NACK information and transmit the NACK information to the source node upon failing to decode the data in step S1150. When the relay node is a type-2 relay like a user-relay, the destination node cannot transmit the NACK information to the relay node because the destination node cannot recognize the relay node. In this case, the relay node can overhear the NACK information transmitted from the destination node to the source node. In step S1160, a circle represented by a dotted line indicates that the relay node can overhear the NACK information transmitted from the destination node to the source node.

In step S1170, the relay node can retransmit data to the destination node according to a HARQ scheme. Here, the retransmitted data may be an RV which is transmitted according to an IR scheme for the data transmitted in step S1140.

Scheduling information used to determine a transmission resource, transmission rate, and modulation and coding scheme used for the relay node to retransmit the data to the destination node in step S1170 may be designated by the source node in advance. Alternatively, the source node may transmit the scheduling information to the relay node before retransmission of the relay node. A method by which the source node determines the scheduling information to be applied to data retransmission of the relay node will be described below in detail.

If the destination node has successfully decoded the data in step S1150, steps S1160 and S1170 are not performed and the process can directly proceed to step S1180.

When the destination node fails to decode the data although the data received in step S1170 is used, steps S1160 and S1170 can be performed again.

In step S1180, the destination node can generate ACK information and transmit the ACK information to the source node when data decoding has been successfully performed. If the relay node is a type-2 relay like a user-relay, the destination node cannot transmit the ACK information to the relay node because the destination node cannot recognize the relay node. In this case, the relay node can overhear the ACK information transmitted from the destination node to the source node. In step S1180, a circle represented by a dotted line indicates that the relay node can overhear the ACK information transmitted from the destination node to the source node.

When the relay node receives (or overhears) the ACK information, the relay node does not use a resource allocated by the source node for HARQ retransmission. Upon reception of the ACK information, the source node can transmit new data to the destination node.

While ACK/NACK information can be transmitted for the data received by the relay node and the destination node in step S1110, description thereof is omitted for clarity of explanation. The embodiment of the present invention is described on the assumption that the data is received without error in step S1110 or the data is finally received without error through HARQ retransmission even if the data has an error in step S1110.

Figure 12:
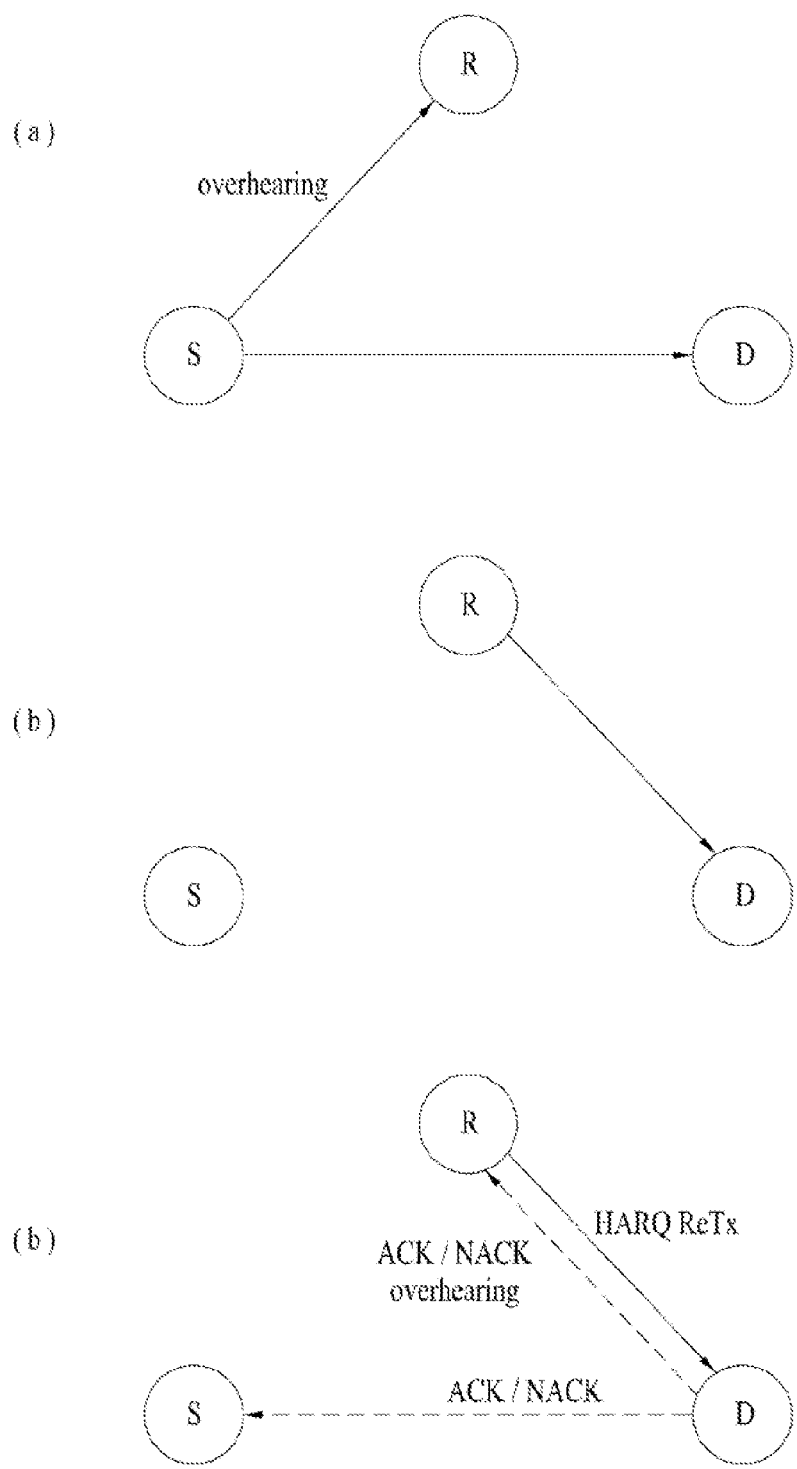
FIG. 12 illustrates cooperative communication through a user-relay.

FIG. 12 is a view for explaining cooperative communication through a user-relay. FIG. 12(a) illustrates a broadcasting phase in which the source node transmits signals to the relay node and the destination node. FIG. 12(b) illustrates a forwarding phase in which the relay node forwards a signal to the destination node. FIG. 12(c) illustrates a HARQ operation phase in which a result (ACK/NACK) of decoding a signal received at the destination node is transmitted and HARQ retransmission (ReTx) is performed when NACK is transmitted.

A description will be given of a method by which the source nodes determine an optimum resource, transmission rate and MCS used for transmission/retransmission from the relay node to the destination node in consideration of probability that outage occurs on the channel between the relay node and the destination node. The scheduling information to be used for transmission/retransmission from the relay node to the destination node may be determined by the source node in advance and signaled to the relay node.

In the following description, the SIC based partial signal relaying method is exemplified. However, the present invention is not limited thereto and the source node can determine the transmission resource and transmission rate to be used by the relay node in a similar manner according to other partial signal relaying methods.

In the broadcasting phase illustrated in FIG. 12(a), the source node can generate data X to be transmitted by superposition-coding a basic layer $x_b$ and a superposed layer $x_{sc}$, as represented by Equation 23.

$$X = (1 - \alpha)x_b + \alpha x_{sc} \quad \text{[Equation 23]}$$

where $$\alpha = \left(\frac{1}{\gamma_{sd}} - \frac{1}{\gamma_{sr}}\right)$$

$$0 \leq \alpha \leq 1$$

$$R_b = \min\left[\log(1 + (1 - \alpha)\gamma_{sd}), \log\left(1 + \frac{(1 - \alpha)\gamma_{sr}}{1 + \alpha\gamma_{sr}}\right)\right]$$

$$R_s = \log(1 + \alpha\gamma_{sr})$$

$$R_2 = \log(1 + \gamma_{rd})$$

$$R_{tot} = \frac{R_b + R_s}{1 + R_s/R_2}$$

In Equation 23, $\alpha$ denotes the ratio of the basic layer $x_b$ to the superposed layer $x_{sc}$, and $(1-\alpha)$ is allocated to the basic layer $x_b$ and $\alpha$ is allocated to the superposed layer $x_{sc}$. $\gamma_{sd}$ represents SNR with respect to the channel between the source node S and the destination node D, $\gamma_{sr}$ represents SNR with respect to the channel between the source node S and the relay node R, and $\gamma_{rd}$ represents SNR with respect to the relay node R and the destination node D. $R_b$ denotes a transmission rate for the basic layer $x_b$, $R_s$ denotes a transmission rate for the superposed layer $x_{sb}$, $R_2$ is a transmission rate between the relay node and the destination node.

In the forwarding phase illustrated in FIG. 12(b), the relay node can decode the signal received (or overheard) from the source node to extract data (e.g. the superposed layer $x_{sc}$) to be forwarded to the destination node and forward the data to the destination node.

Since it is assumed that the channel between the relay node and the destination node is an open-loop environment, a resource (time resource and/or frequency resource) to be used for the relay node to transmit data to the destination node can be allocated in advance by the source node. For example, a time resource $T_2$ to be used for the relay node to transmit data to the destination node is determined in advance by the source node, and the source node can determine an optimum resource on the basis of outage probability using average channel information between the relay node and the destination node because the source node is not correctly aware of a channel state.

Equation 24 represents outage generation probability in the forwarding phase illustrated in FIG. 12(b).

$$P_{out(2)} = Pr[R_2 < R_s/T_2] \leq \delta_2 \quad \text{[Equation 24]}$$

$$= 1 - \exp[-2^{R_s/T_2} - 1)/SNR_{RD}] \leq \delta_2$$

In Equation 24, $R_2$ and $R_S$ are as defined in Equation 23. According to Equation 24, it is possible to define outage generation probability $P_{out(2)}$ according to the time resource $T_2$ to be used for the relay node to perform transmission to the destination node on the basis of the quantity of information per unit time, $R_s$, which needs to be transmitted by the relay node. $\delta_2$ denotes a reference value for the outage probability, which determines whether outage occurs in the forwarding phase of FIG. 12(b), and $SNR_{RD}$ represents average SNR between the relay node and the destination node. When Equation 24 is rearranged in terms of $T_2$, Equation 25 can be derived.

$$T_2 \geq \frac{R_s}{\log_2[1 - SNR_{RD}\ln(1-\delta_2)]} \quad \text{[Equation 25]}$$

A transmission rate $\bar{R}_2$ at which the relay node transmits a signal to the destination node in the forwarding phase of FIG. 12(b) on the basis of Equation 25 can be determined by Equation 26.

$$\bar{R}_2 \triangleq R_s/T_2 \leq \log_2[1 - SNR_{RD}\ln(1-\delta_2)] \quad \text{[Equation 26]}$$

As illustrated in the HARQ operation phase of FIG. 12(c), when an error is generated in the signal transmitted from the relay node to the destination node for the time resource $T_2$ determined as above, and thus the destination node transmits a NACK signal and the relay node overhears the NACK signal, the relay node performs retransmission. Here, a resource used for the relay node to retransmit data to the destination node can also be determined in advance by the source node.

It may be assumed that the channel condition between the relay node and the destination node in the forwarding phase of FIG. 12(b) is equal to the channel condition between the relay node and the destination node in the HARQ operation phase of FIG. 12(c). In other words, it is assumed that the channel between the relay node and the destination node is a quasi-static channel. Under this condition, a time resource $T_3$ used for retransmission of the relay node can be determined by Equations 27 and 28. Equation 27 represents outage generation probability during HARQ retransmission in the HARQ operation phase of FIG. 12(c).

$$P_{out(3)} = Pr[R_2 < R_s/(T_2+T_3) | R_2 < R_s/T_2] \leq \delta_3 \quad \text{[Equation 27]}$$

$$= \frac{1}{\delta_2} Pr[R_2 < R_s/(T_2+T_3)] \leq \delta_3$$

According to Equation 27, it is possible to define outage generation probability $P_{out(3)}$ according to the quantity of information per unit time, $R_s$, which needs to be transmitted by the relay node, in the time resource $T_3$ to be used for the relay node to perform retransmission to the destination node on the basis of the outage generation probability in the forwarding phase of FIG. 23(b). $\delta_3$ denotes a reference value for the outage probability, which determines whether outage occurs in the HARQ operation phase of FIG. 12(c). When Equation 27 is rearranged in terms of $T_3$, Equation 28 can be derived.

$$T_3 \geq R_s \left[\frac{1}{\log_2[1-SNR_{RD}\ln(1-\delta_2\delta_3)]} - \frac{1}{\bar{R}_2}\right] \quad \text{[Equation 28]}$$

A transmission rate $\bar{R}_3$ at which the relay node transmits a signal to the destination node in the HARQ retransmission phase of FIG. 12(c) can be determined on the basis of Equation 27, as represented by Equation 29.

$$\bar{R}_3 \triangleq R_s/(T_2+T_3) \leq \log_2[1-SNR_{RD}\ln(1-\delta_2\delta_3)] \quad \text{[Equation 29]}$$

In the HARQ operation phase of FIG. 12(c), only redundant data from among the data forwarded from the relay node to the destination node in the forwarding phase of FIG. 12(b) can be transmitted and IR based HARQ operation that performs decoding on the basis of data accumulated at the destination node can be applied.

As described above, the source node can determine the time resources $T_2$ and $T_3$ to be used for transmission and retransmission from the relay node to the destination node as optimum values. Determination of the optimum values for $T_2$ and $T_3$ may involve selection of values that maximize the total transmission rate $R_{tot}$. This can be represented by Equation 30.

$$\max_{T_2, T_3} R_{tot} = \quad \text{[Equation 30]}$$

$$\frac{R_b + R_s}{1+T_2}(1 - P_{out(2)}) + \frac{R_b + R_s}{1+T_2+T_3} P_{out(2)}(1 - P_{out(3)})$$

As can be seen from Equation 30, the total transmission rate decreases while the outage probability is reduced as $T_2$ and $T_3$ increase. Accordingly, it is possible to allocate optimum time resources that maximize a transmission rate that can be obtained on average by estimating optimum $T_2$ and $T_3$ according to Equation 30.

As described above, when it is difficult to estimate correct information about the channel between the relay node and the destination node (i.e. when a type-2 relay such as a user-relay is used), the source node can proactively determine the scheduling information for transmission from the relay node to the destination node and signal the scheduling information to the relay node when data is delivered from the source node to the destination node via the relay node according to the partial signal relaying method. Accordingly, it is possible to allocate an optimum time resource using stochastic characteristics even in an open-loop environment in which correct information about the channel between the relay node and the destination node is not provided. While the time resource is allocated to the relay node in the above description, the principle of the present invention can be applied to a case in which a frequency resource is allocated according to outage probability. Since the source node schedules a resource, transmission rate, etc. to be used for transmission/retransmission from the relay node to the destination node on the basis of outage generation probability as described above, limitations of a case in which information about the channel between the relay node and the destination node cannot be acquired can be effectively overcome.

Figure 13:
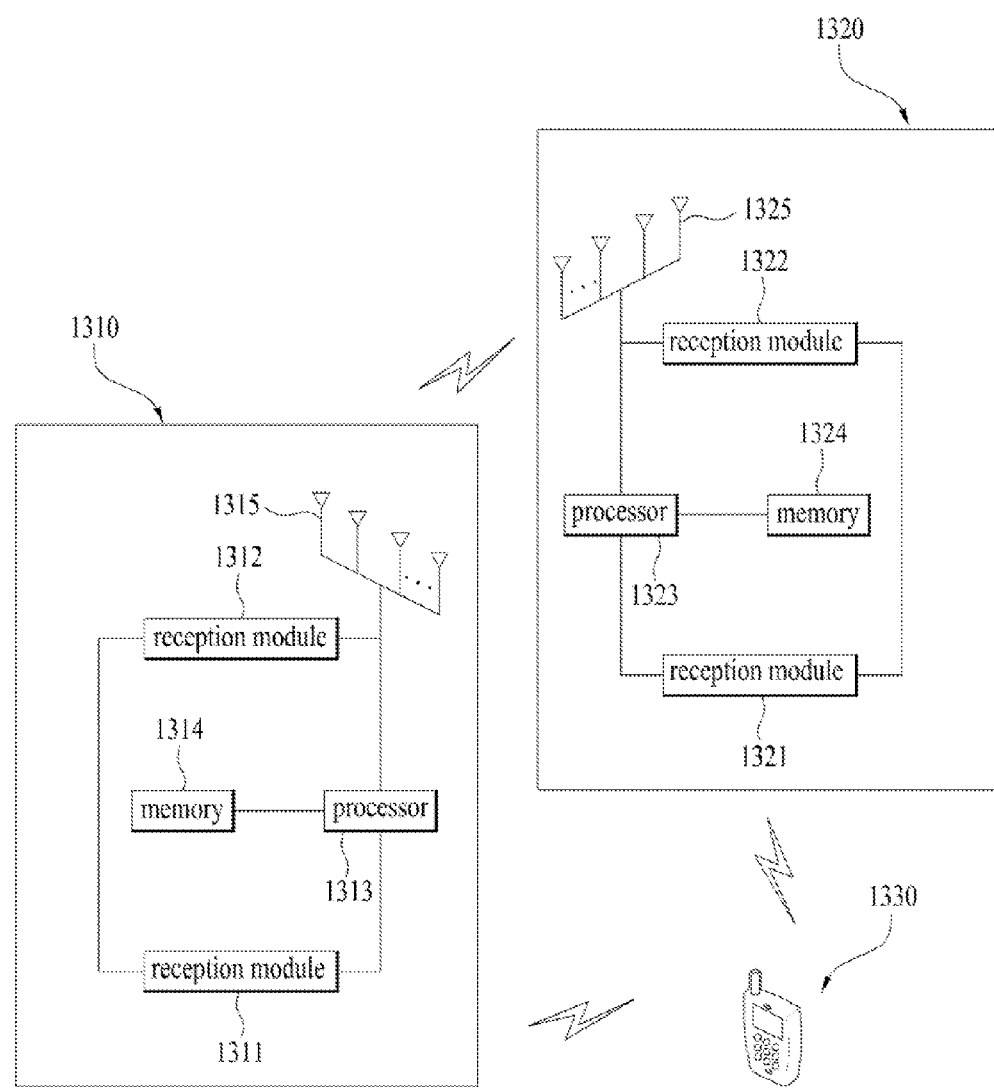
FIG. 13 illustrates a wireless communication system including a BS, a relay node and a UE according to the present invention.

FIG. 13 illustrates a wireless communication system including a BS, a relay node and a UE according to the present invention.

Referring to FIG. 13, the BS 1310 according to the present invention may include a reception module 1311, a transmission module 1312, a processor 1313, a memory 1314, and a plurality of antennas 1315. The plurality of antennas 1315 indicates that the BS supports MIMO transmission and reception. The reception module 1311 can receive signals, data and information on uplink from one or both of the UE and the relay. The transmission module 1312 can transmit signals, data and information on downlink to one or both of the UE and the relay. The processor 1313 can control the overall operation of the BS 1310.

The BS 1310 according to an embodiment of the present invention can be configured to generate data and transmit the data to the relay node and the UE according to a partial signal relaying method. The processor 1313 of the BS 1310 can concatenate data for the relay node with first data for the UE and encode the concatenated data to generate a first codeword. Furthermore, the processor 1313 can encode second data for the UE to generate a second codeword. In addition, the processor 1313 can transmit the first codeword to the relay node and send the second codeword to the UE through the transmission module.

The first codeword and the second codeword may be generated using a proactive interference cancellation technique. The UE can restore data transmitted thereto using the first data and the second data. For example, the first data and the second data can respectively correspond to parts obtained by partitioning information which is destined for the UE and has been channel-coded by a channel code in the BS. The first data for the UE may be delivered to the UE via the relay node. In this case, one or both of a time resource and a frequency resource used for the relay node to deliver the first data to the UE can be variably determined by the BS. If a data transmission rate per unit time $C_1(\alpha, P_1)$ with respect to the relay node and a data transmission rate per unit time $C_2(\alpha, P_1, P_2)$ with respect to the UE are determined as represented by Equation 20, the BS can determine $\alpha$, $P_1$ and $P_2$ in order to improve the transmission rates.

The BS 1310 according to another embodiment of the present invention can previously designate scheduling information for transmission/retransmission of the relay node when transmitting data to the UE via the relay node according to the partial signal relaying method. The processor 1313 of the BS can transmit a signal including the first data to be delivered from the relay node to the UE to the relay node through the transmission module. Furthermore, the processor 1313 can transmit a signal including the second data to the UE. In addition, the processor 1313 can receive HARQ ACK/NACK information regarding the first data delivered to the UE through the relay node from the UE through the reception module. When the HARQ ACK/NACK information corresponds to NACK, the relay node instead of the BS can retransmit the first data to the UE. Scheduling information for transmission of the first data from the relay node to the UE and scheduling information for retransmission of the first data can be designated in advance by the BS.

The scheduling information for transmission/retransmission of the first data, performed by the relay node, can be determined on the basis of probability that outage occurs on a channel between the relay node and the UE. The scheduling information can include one or more of a time resource, a frequency resource and a transmission rate, which are used for transmission or retransmission of the first data. For example, the transmission rate of the relay node can be determined as represented by Equations 26 and 29 and the time resource for transmission/retransmission of the relay node can be previously designated by the BS such that the total transmission rate is maximized, as represented by Equation 30.

The relay node can overhear HARQ ACK/NACK information with respect to transmission or retransmission of the first data, which is transmitted by the UE, and thus HARQ retransmission operation can be performed. Retransmission of the relay node may be performed according to an IR scheme. The UE can restore the data destined therefor using the first data delivered through the relay node and the second data directly transmitted from the BS to the UE. For example, the first data and the second data can respectively correspond to parts obtained by partitioning information which is destined for the UE and has been channel-coded by a channel code in the BS.

The processor 1313 of the BS 1310 can process information received by the BS 1310, information to be transmitted from the BS, etc. The memory 1314 can store the processed information for a predetermined time. The memory 1314 may be replaced by a component such as a buffer (not shown).

Referring to FIG. 13, the relay node 1320 according to the present invention may include a reception module 1321, a transmission module 1322, a processor 1323, a memory 1324, and a plurality of antennas 1325. The plurality of antennas 1325 indicates that the relay node supports MIMO transmission and reception. The reception module 1321 may include a first reception module and a second reception module. The first reception module can receive signals, data and information on downlink from the BS and the second reception module can receive signals, data and information on uplink from the UE. The transmission module 1322 may include a first transmission module and a second transmission module. The first transmission module can transmit signals, data and information on uplink to the BS and the second transmission module can transmit signals, data and information on downlink to the UE. The processor 1323 can control the overall operation of the relay node 1320.

The relay node 1320 according to an embodiment of the present invention can be configured to deliver data to the UE according to a partial signal relaying method. The processor 1323 of the relay node 1320 can receive the first codeword, which is generated by the BS by concatenating the data for the relay node with the first data for the UE and encoding the concatenated data, from the BS through the first reception module. Furthermore, the processor 1323 can extract the first data from the first codeword. In addition, the processor 1323 can transmit the extracted first data to the UE through the second transmission module.

One or both of a time resource and a frequency resource used for the relay node to deliver the first data to the UE can be variably determined by the BS. The second codeword, which is generated by the BS by encoding the second data for the UE, can be transmitted from the BS to the UE. The first codeword and the second codeword can be generated using a proactive interference cancellation technique. The UE can restore data transmitted thereto using the first data and the second data. For example, the first data and the second data can respectively correspond to parts obtained by partitioning information which is destined for the UE and has been channel-coded by a channel code in the BS. If a data transmission rate per unit time $C_1(\alpha, P_1)$ from the BS to the relay node and a data transmission rate per unit time $C_2(\alpha, P_1, P_2)$ from the BS to the UE are determined as represented by Equation 20, the BS can determine $\alpha$, $P_1$ and $P_2$ in order to improve the transmission rates.

The relay node 1320 according to another embodiment of the present invention can transmit/retransmit data to the UE using resource scheduled by the BS when data is delivered to the UE through the relay node according to the partial signal relaying method. The processor 1323 of the relay node can receive a signal including the first data to be delivered to the UE through the relay node from the BS via the first reception module. Furthermore, the processor 1323 can transmit the first data to the UE through the second transmission module. In addition, the processor 1323 can receive HARQ ACK/NACK information regarding the first data from the UE through the second reception module. When the HARQ ACK/NACK information corresponds to NACK, the processor 1323 can retransmit the first data to the UE through the second transmission module. Here, scheduling information for transmission of the first data from the relay node to the UE and scheduling information for retransmission of the first data can be designated in advance by the BS.

The scheduling information for transmission/retransmission of the first data, performed by the relay node, can be determined by the BS on the basis of probability that outage occurs on a channel between the relay node and the UE. The scheduling information can include one or more of a time resource, a frequency resource and a transmission rate, which are used for transmission or retransmission of the first data. For example, the transmission rate of the relay node can be determined as represented by Equations 26 and 29 and the time resource for transmission/retransmission of the relay node can be previously designated by the BS such that the total transmission rate is maximized, as represented by Equation 30.

The relay node can overhear HARQ ACK/NACK information with respect to transmission or retransmission of the first data, which is transmitted by the UE, and thus HARQ retransmission operation can be performed. Retransmission of the relay node may be performed according to the IR scheme. The UE can restore the data destined therefor using the first data delivered through the relay node and the second data directly transmitted from the BS to the UE. For example, the first data and the second data can respectively correspond to parts obtained by partitioning information which is destined for the UE and has been channel-coded by a channel code in the BS.

The processor 1323 of the relay node 1320 can process information received by the relay node 1320, information to be transmitted from the relay node, etc. The memory 1324 can store the processed information for a predetermined time. The memory 1324 may be replaced by a component such as a buffer (not shown).

The above-mentioned various embodiments of the present invention can be independently applied to configurations of the BS, relay node and UE or two or more embodiments can be simultaneously applied thereto, and redundant is omitted for clarity of description.

In the description with reference to FIG. 13, the BS 1310 may correspond to the source node S, the relay node 1320 may correspond to the relay node R and the UE 1330 may correspond to the destination node D in the above-described embodiments of the present invention.

Furthermore, description of the BS 1310 shown FIG. 13 can be applied to a relay node controlling a cell. In addition, description about the BS 1310 shown FIG. 13 can be applied to a UE (that is, a user-relay) that assists other UEs.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The above-described embodiments of the present invention can be applied to various mobile communication systems.

The invention claimed is:

1. A method for transmitting data from a base station, the method comprising:
transmitting, to a relay node, a signal including first data to be delivered to a user equipment via the relay node;
transmitting a signal including second data to the user equipment; and
receiving, from the user equipment, HARQ ACK/NACK information regarding the first data delivered to the user equipment through the relay node,
wherein the first data is retransmitted to the user equipment from the relay node when the HARQ ACK/NACK information is NACK,
wherein a first time resource for transmission of the first data from the relay node to the user equipment is determined by Equation A, and
wherein a second time resource for retransmission of the first data is determined by Equation B, $$T_2 \geq \frac{R_s}{\log_2[1 - SNR_{RD}\ln(1-\delta_2)]} \quad \text{[Equation A]}$$

$$T_3 \geq R_s \left[ \frac{1}{\log_2[1 - SNR_{RD}\ln(1-\delta_2\delta_3)]} - \frac{1}{R_2} \right] \quad \text{[Equation B]}$$

where
$T_2$ is the first time resource for transmission of the first data,
$T_3$ is the second time resource for retransmission of the first data, $R_s = \log(1+\alpha\gamma_{sr})$, $\alpha$ denotes the ratio of a basic layer to a superposed layer,
$\gamma_{sr}$ represents SNR with respect to the channel between the base station and the relay node, $R_2 = \log(1+\gamma_{rd})$, $\gamma_{rd}$ represents SNR with respect to the relay node and the user equipment,
$\delta_2$ denotes a reference value for outage probability in step of transmission of the first data,
$\delta_3$ denotes a reference value for outage probability in step of retransmission of the first data, and
$SNR_{RD}$ represents average SNR between the relay node and user equipment.

2. The method according to claim 1, wherein the relay node overhears the HARQ ACK/NACK information regarding transmission or retransmission of the first data, transmitted from the user equipment.

3. The method according to claim 1, wherein retransmission of the relay node is performed according to an incremented redundancy (IR) scheme.

4. The method according to claim 1, wherein the user equipment restores data therefor using the first data and the second data.

5. The method according to claim 1, wherein the first data and the second data respectively correspond to parts obtained by partitioning information channel-coded by a channel coder in the base station, the information being destined for the user equipment.

6. A method for transmitting data from a relay node, the method comprising:
receiving, from a base station, a signal including first data to be delivered to a user equipment via the relay node;
transmitting the first data to the user equipment;
receiving HARQ ACK/NACK information regarding the first data from the user equipment; and
retransmitting the first data to the user equipment when the HARQ ACK/NACK information is NACK,
wherein a first time resource for transmission of the first data from the relay node to the user equipment is determined by Equation A, and
wherein a second time resource for retransmission of the first data is determined by Equation B, $$T_2 \geq \frac{R_s}{\log_2[1 - SNR_{RD}\ln(1-\delta_2)]} \quad \text{[Equation A]}$$

$$T_3 \geq R_s \left[ \frac{1}{\log_2[1 - SNR_{RD}\ln(1-\delta_2\delta_3)]} - \frac{1}{R_2} \right] \quad \text{[Equation B]}$$

where
$T_2$ is the first time resource for transmission of the first data,
$T_3$ is the second time resource for retransmission of the first data, $R_s = \log(1+\alpha\gamma_{sr})$, $\alpha$ denotes the ratio of a basic layer to a superposed layer,
$\gamma_{sr}$ represents SNR with respect to the channel between the base station and the relay node $R_2 = \log(1+\gamma_{rd})$, $\gamma_{rd}$ represents SNR with respect to the relay node and the user equipment,
$\delta_2$ denotes a reference value for outage probability in step of transmission of the first data,
$\delta_3$ denotes a reference value for outage probability in step of retransmission of the first data, and
$SNR_{RD}$ represents average SNR between the relay node and user equipment.

7. The method according to claim 6, wherein the relay node overhears the HARQ ACK/NACK information regarding transmission or retransmission of the first data, transmitted from the user equipment.

8. The method according to claim 6, wherein retransmission of the relay node is performed according to an incremented redundancy (IR) scheme.

9. The method according to claim 6, wherein a signal including second data is transmitted from the base station to the user equipment before the HARQ ACK/NACK information is received, and the user equipment restores data therefor using the first data and the second data.

10. The method according to claim 9, wherein the first data and the second data respectively correspond to parts obtained by partitioning information channel-coded by a channel coder in the base station, the information being destined for the user equipment.

11. A base station transmitting data, comprising:
a transmission module for transmitting signals to one or both of a relay node and a user equipment;
a reception module for receiving signals from one or both of the relay node and the user equipment; and
a processor for controlling operations of the base station, the processor being connected to the reception module and the transmission module,
wherein the processor is configured to transmit, to the relay node through the transmission module, a signal including first data to be delivered to the user equipment via the relay node, to transmit a signal including second data to the user equipment through the transmission module, and to receive, from the user equipment through the reception module, HARQ ACK/NACK information regarding the first data delivered to the user equipment through the relay node,
wherein the first data is retransmitted to the user equipment from the relay node when the HARQ ACK/NACK information is NACK,
wherein a first time resource for transmission of the first data from the relay node to the user equipment is determined by Equation A, and
wherein a second time resource for retransmission of the first data is determined by Equation B, $$T_2 \geq \frac{R_s}{\log_2[1 - SNR_{RD}\ln(1-\delta_2)]} \quad \text{[Equation A]}$$

$$T_3 \geq R_s \left[ \frac{1}{\log_2[1 - SNR_{RD}\ln(1-\delta_2\delta_3)]} - \frac{1}{R_2} \right] \quad \text{[Equation B]}$$

where
$T_2$ is the first time resource for transmission of the first data,
$T_3$ is the second time resource for retransmission of the first data, $R_s = \log(1+\alpha\gamma_{sr})$, $\alpha$ denotes the ratio of a basic layer to a superposed layer,
$\gamma_{sr}$ represents SNR with respect to the channel between the base station and the relay node $R_2 = \log(1+\gamma_{rd})$, $\gamma_{rd}$ represents SNR with respect to the relay node and the user equipment,
$\delta_2$ denotes a reference value for outage probability in step of transmission of the first data,
$\delta_3$ denotes a reference value for outage probability in step of retransmission of the first data, and
$SNR_{RD}$ represents average SNR between the relay node and user equipment.

12. A relay node transmitting data, comprising:
a first reception module for receiving a signal from a base station;
a first transmission module for transmitting a signal to the base station;
a second reception module for receiving a signal from a user equipment;

a second transmission module for transmitting a signal to the user equipment; and a processor for controlling operations of the relay node, the processor being connected to the first and second reception modules and the first and second transmission modules, wherein the processor is configured to receive, from the base station through the first reception module, a signal including first data to be delivered to the user equipment via the relay node, to transmit the first data to the user equipment through the second transmission module, to receive HARQ ACK/NACK information regarding the first data from the user equipment through the second reception module, and to retransmit the first data to the user equipment through the second transmission module when the HARQ ACK/NACK information is NACK, wherein a first time resource for transmission of the first data from the relay node to the user equipment is determined by Equation A, and wherein a second time resource for retransmission of the first data is determined by Equation B, $$T_2 \geq \frac{R_s}{\log_2[1 - SNR_{RD}\ln(1-\delta_2)]}$$ [Equation A]

$$T_3 \geq R_s\left[\frac{1}{\log_2[1 - SNR_{RD}\ln(1-\delta_2\delta_3)]} - \frac{1}{R_2}\right]$$ [Equation B]

where $T_2$ is the first time resource for transmission of the first data, $T_3$ is the second time resource for retransmission of the first data, $R_s = \log(1+\alpha\gamma_{sr})$, $\alpha$ denotes the ratio of a basic layer to a superposed layer, $\gamma_{sr}$ represents SNR with respect to the channel between the base station and the relay node $R_2 = \log(1+\gamma_{rd})$, $\gamma_{rd}$ represents SNR with respect to the relay node and the user equipment, $\delta_2$ denotes a reference value for outage probability in step of transmission of the first data, $\delta_3$ denotes a reference value for outage probability in step of retransmission of the first data, and $SNR_{RD}$ represents average SNR between the relay node and user equipment.

* * * * *